United States Patent

Kasuga et al.

[11] Patent Number: 5,920,442
[45] Date of Patent: Jul. 6, 1999

[54] CASSETTE LOADING DEVICE

[75] Inventors: Kyoji Kasuga, Souraku-gun; Masanobu Furukawa, Nara; Hideshi Ohtsuka; Mitsunobu Yoshida, both of Tenri, all of Japan

[73] Assignee: Sharp Kabushiki Kaisha, Osaka, Japan

[21] Appl. No.: 08/839,319

[22] Filed: Apr. 17, 1997

[30] Foreign Application Priority Data

May 17, 1996 [JP] Japan ................................ 8-123279
May 17, 1996 [JP] Japan ................................ 8-123280

[51] Int. Cl.$^6$ ............................. G11B 5/008; G11B 17/04
[52] U.S. Cl. .......................................... 360/94; 360/99.06
[58] Field of Search ....................... 360/92, 96.5, 99.02, 360/99.06; 369/34, 36, 75.1–75.2, 77.1–77.2

[56] References Cited

U.S. PATENT DOCUMENTS 5,067,036 11/1991 Ozawa ................................. 360/96.5

FOREIGN PATENT DOCUMENTS

| 0316156A2 | 5/1989 | European Pat. Off. . |
| 0356184A2 | 2/1990 | European Pat. Off. . |
| 0374899A2 | 6/1990 | European Pat. Off. . |
| 542482 | 5/1993 | European Pat. Off. ................. 360/92 |
| 0557726A2 | 9/1993 | European Pat. Off. . |
| 0570134A2 | 11/1993 | European Pat. Off. . |

*Primary Examiner*—Allen T. Cao

[57] ABSTRACT

A cassette loading device including the following configuration: one cassette holder is fitted into the other cassette holder so as to slide in the cassette's direction of movement relative to the other. The other cassette holder is moved in linkage with the cassette pushing operation for magnetic tape cassette inserted into the one cassette holder, with a different amount of stroke from the pushed amount of stroke for the magnetic tape cassette inserted in the one cassette holder. Also, a timing change lever which is rotationally supported at a central portion across the length, is adapted to selectively become engaged at its distal end with the magnetic tape cassette held in the cassette holder. In the terminal end of the movement of the cassette, the opening which is provided at the other end of the timing change lever is detected so that the cassette in-pulling operation starts at the timing of the detection.

17 Claims, 29 Drawing Sheets

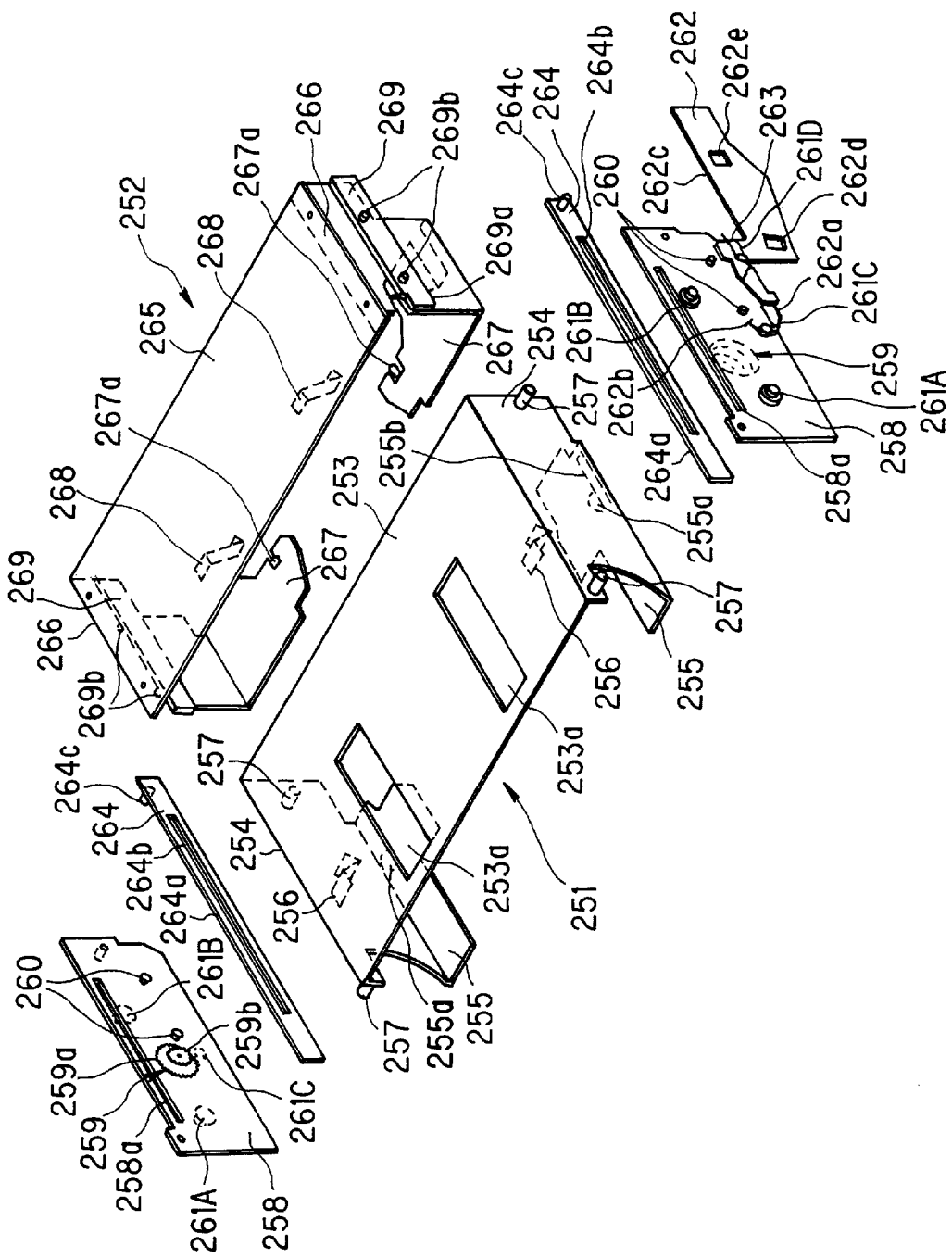

5,920,442

CASSETTE LOADING DEVICE

BACKGROUND OF THE INVENTION (1) Field of the Invention

The present invention relates to a cassette loading device for loading a magnetic tape cassette selected from multiple types of magnetic tape cassettes different in outside dimensions from one another.

(2) Description of the Prior Art

In recent years, a variety of magnetic recording/reproducing apparatuses (to be referred to hereinbelow as VTR) of various standards (i.e., magnetic recording methods) have been developed into products, and various VTRs based on different standards tend to compete for market share. For this reason, various kinds of magnetic tape cassettes (to be referred to hereinbelow as cassette) corresponding to different standards or various kinds of cassettes based on the same standard but different in cassette size (outside diameter, reel distance) are put onto the market. As a result, it is necessary for users to pay attention to the interchangeability between cassettes.

For this reason, the market demands a general-purpose VTR which can deal with different standards and different cassette sizes. As a VTR having such general-purpose characteristics, a compatible VTR which can perform recording and reproduction for two types of cassettes on the same standard but different in size, namely, the standard cassette (to be called L-cassette) and the compact cassette (to be called S-cassette), has been developed.

Referring next to the drawings, an example of the conventional compatible VTR will be described.

FIGS. 1A and 1B are plan views showing a conventional cassette loading device 100 incorporated in the compatible VTR; FIG. 2 is a front view of FIG. 1; and FIGS. 3A, 3B, 4A, 4B and 5 are perspective views showing essential parts.

Cassette loading device 100 has a cassette holder 101, which is integrally formed of a top portion 102, left and right side portions 103, and L-cassette guiding pieces 104 for guiding the undersurface of L-cassette LC. L-cassette guiding piece 104 has an integrally formed S-cassette guiding piece 105 at its distal end. L-cassette guiding piece 104 has a stopper piece 104a which has been formed upright to bear the front part, with respect to the cassette's direction of movement, of L-cassette LC. Further, S-cassette guiding piece 105 has a stopper piece 105a which has been formed upright to bear the front part, with respect to the cassette's direction of movement, of S-cassette SC.

Each side portion 103 has 1st through 3rd slider axles 106A, 106B and 106C press fitted. Leaf springs 107 and 108 for pressing L-cassette and S-cassette, respectively are press fitted in top portion 102. In the mode shown in FIG. 3B, an engaging boss 106D is provided on only the side portion 103 located on the right side in the figure.

A mech-chassis 109 which supports cassette loading device 100, has a pair of right and left frames 110A and 110B standing upright parallel to each other. Each frame 110A and 110B has integrally formed, inwardly bent flanges 110a on the upper edge thereof. A top plate 111 supported by these flanges 110a, is provided between frames 110A and 110B. Pivotally supported between frames 110A and 110B is a cassette port door 112 for opening and closing the port of cassette holder 101. Cassette port door 112 is biased toward the closed direction by an unillustrated door shutting spring.

Frames 110A and 110B each have a 1st L-shaped guide slot 113a engaged with and guiding 1st slider axle 106A of cassette holder 101, and a 2nd L-shaped guide slot 113b engaged with and guiding 2nd slider axle 106B, whereby cassette holder 101 is supported so as to be able to slide along guide slots 113a and 113b. Further, frames 110A and 110B each have a rib-formed guide slot 113c which is engaged with 3rd slider axle 106C to guide the downward movement of cassette holder 101 when it moves downwards (to be described later).

Drive arms 114A and 114B are pivoted on the inner sides of respective frames 110A and 110B so that they are free to rock back and forth. Drive arms 114A and 114B each have a semicircular gear 114a formed coaxially with the support axle thereof. Rotationally supported between left and right frames 110A and 110B is a link shaft 115. This link shaft 115 has timing gears 116, 116 attached at both ends in phase. Timing gears 116, 116 are in mesh with semicircular gears 114a of drive arms 114A and 114B, respectively, so that both drive arms 114A and 114B will sway integrally.

Drive arms 114A and 114B have respective slots 114b, 114b, which extend along the length thereof. This slot 114b is engaged with 1st slider axle 106A which also fits through 1st guide slot 113a. Left drive arm 114B has another semicircular gear 114c which is formed coaxially with the support axle of drive arm 114B. Drive arms 114A and 114B each have a cassette pressing spring 114d which urges 1st slider axle 106A engaging slot 114b, in such a direction as to press the distal end of drive arm 114A or 114B toward the chassis interior (in the clockwise direction in FIGS. 4A and 4B, and in the counterclockwise direction in FIG. 5).

The outer side of left frame 110B has 4th through 6th slider axles 117A, 117B and 117C press fitted thereon. A double-acting plate 118 is provided on the outer side of left frame 110B. Double-acting plate 118 has guide slots 118a, 118b and 118c which are engaged with 4th through 6th slider axles 117A to 117C, respectively, so that double-acting plate 118 will be able to move back and forth relative to frame 110B in the cassette's direction of movement. Double-acting plate 118 has a rack gear 118d meshed with semicircular gear 114c of drive arm 114B so that double-acting plate 118 will move linearly in the cassette's direction of insertion as drive arm 114B moves swayingly.

Provided on the outer side of double-acting plate 118 is a driving plate 119, which has guide slots 119a, 119b and 119c engaged with 4th through 6th slider axles 117A to 117C, respectively. By this arrangement, driving plate 119 will be able to move back and fourth relative to frame 110B in the cassette's direction of movement.

A double-acting spring 120, a tension spring is provided between double-acting plate 118 and driving plate 119 at their inner ends thereof. Formed on the near end of driving plate 119 is an abutment piece 119d which is bent toward double-acting plate 118 so that it will abut double-acting plate 118. Driving plate 119 has a rack gear 119e which, similarly to rack gear 118d, is in mesh with semicircular gear 114c and another rack gear 119f which receives the driving force from an unillustrated driver motor for loading.

Rack gear 118d is formed with such a length as to be in mesh with semicircular gear 114c from the beginning of the rocking movement of drive arm 114B to the end. Rack gear 119e is formed with such a length that it will not be in mesh at the beginning of the rocking movement of drive arm 114B but will become engaged with the other semicircular gear 114c of the drive arm 114B in the course of rocking movement of the arm to the end.

In the mode shown in FIG. 1B, mech-chassis 109 has a light emitter 121. Provided on the inner side of frame 110A positioned on the right side in FIG. 1B are a light-receiving sensor 122 that receives the sensor light from light emitter 121 and a shutter 123 as shown in FIG. 4B. Shutter 123 is provided so as to move up and down along the inner side of frame 110A and is urged upward by means of a spring 124. Shutter 123 has a slanting surface 123a in the upper part thereof which is engaged with engaging boss 106D of cassette holder 101. Further, shutter 123 is formed with an opening 123b which allows completion of the optical path from light emitter 121 to light-receiving sensor 122 only when engaging boss 106D becomes engaged with the shutter forcibly moving it downwards.

The sensing device consisting of light emitter 121 and light-receiving sensor 122 detects the timing of starting the cassette in-pulling operation (to be described next), and in addition, performs BOT detection (detection of the beginning of taking up the magnetic tape accommodated in cassette LC or SC) and EOT detection (detection of the end of taking up the magnetic tape accommodated in cassette LC or SC). Due to the tape winding direction of the cassette, the sensing device provided on the right of the frame in the figure is adapted to detect BOT, whereas the sensing device on the left of the frame is adapted to detects EOT.

Referring next to FIGS. 6A–6F, the loading operation of an L-cassette LC will be described. First, as shown in FIGS. 6A and 6C, an L-cassette LC is inserted from an unillustrated inserting port so that it is placed on L-cassette guiding piece 104 of cassette holder 101. A further insertion of the L-cassette LC into the chassis interior makes it abut stopper piece 104a, on its inner side edge with respect to the moving direction of LC-cassette LC. In this condition, the L-cassette LC is pressed against L-cassette guiding piece 104 from above by leaf springs 107, so that it will be stably held inside cassette holder 101.

When the L-cassette LC is further pushed in, the L-cassette LC presses stopper piece 104a so that cassette holder 101 slightly moves inward. At this moment, 1st and 2nd slider axles 106A and 106B move whilst being guided along respective 1st and 2nd guide slots 113a and 113b. The distal ends of drive arms 114A and 114B whose slots 114b are engaged with 1st and 2nd slider axles 106A and 106B, move swayingly toward the chassis interior (in the clockwise direction in FIGS. 4A, 6C to 6F, and in the counterclockwise direction in FIG. 5). Then, double-acting plate 118 meshed with semicircular gear 114c formed in left drive arm 114B slightly moves toward the chassis interior.

As shown in FIG. 6D, when double-acting plate 118 has moved slightly toward the chassis interior, engaging boss 106D formed in cassette holder 101 becomes engaged with slanting surface 123a of shutter 123 so as to forcibly move shutter 123 downward opposing the force of spring 124. As a result, opening 123b of shutter 123 moves into the optical path between light emitter 121 and light-receiving sensor 122 so that it allows light-receiving sensor 122 to receive the sensor light from light emitter 121. This activates an unillustrated motor whose driving force is transmitted to rack gear 119f. As a result, driving plate 119 moves toward the chassis interior. When it has moved to a position where abutment piece 119d abuts double-acting plate 118, double-acting plate 118 together with driving plate 119 begins to move toward the chassis interior.

When double-acting plate 118 has been forcibly shifted toward the chassis interior by driving plate 119, the arm end of drive arm 114B meshed with rack gear 118d swayingly moves toward the chassis interior (in the clockwise direction in FIGS. 4A, 6C to 6F, and in the counterclockwise direction in FIG. 5) while driving arm 114A also swayingly moves in the same direction through timing gear 116, link shaft 115 and timing gear 116. Then, 1st slider axles 106A engaging slots 114b of drive arms 114A and 114B move toward the chassis interior, and this causes cassette holder 101 to move together with the L-cassette LC toward the chassis interior.

In this way, as cassette holder 101 continues to move toward the chassis interior, 1st and 2nd slider axles 106A and 106B, as also shown in FIG. 6E, will reach the vertically slotted portions of 1st and 2nd guide slots 113a and 113b, and 3rd slider axle 106C will become engaged with rib-formed guide slot 113c.

Before 1st and 2nd slider axles 106A and 106B reach the vertically slotted portions of 1st and 2nd guide slots 113a and 113b, an unillustrated cassette size detecting lever provided on mech-chassis 109 detects the inserted cassette as to be an L-cassette LC, to thereby drive an unillustrated reel table shifting mechanism. In this way, unillustrated reel tables are adjusted so that the distance between the reel tables will match the reel distance of L-cassette LC.

When driving plate 119 is further driven toward the chassis interior by an unillustrated motor, drive arms 114A and 114B sways more. Then, 1st and 2nd slider axles 106A and 106B move downwards along the vertically slotted portions of 1st and 2nd guide slots 113a and 113b, and 3rd slider axles 106C go down along rib-formed guide slots 113c. Consequently, cassette holder 101 moves downwards together with the L-cassette LC.

When cassette holder 101 has moved down to its terminal position, the L-cassette LC is placed on four cassette stays 125 (see FIG. 6F) planted on mech-chassis 109. In this condition, cassette holder 101 is pressed downwards by means of cassette pressing springs 114d provided for drive arms 114A and 114B. Therefore, the L-cassette LC becomes pressed in contact with cassette stays 125 with its bottom slightly spaced away from L-cassette guiding piece 104.

Thus, the loading operation of L-cassette LC is completed. The ejecting operation of L-cassette LC is effected in the reverse order of the aforementioned loading operation.

Next, the loading operation of an S-cassette SC will be described. First, as shown in FIGS. 7A and 7C, the S-cassette SC is inserted from an unillustrated inserting port so that it is placed on S-cassette guiding piece 105 of cassette holder 101. A further insertion of the S-cassette SC into the chassis interior makes it abut stopper piece 105a, on its inner side edge with respect to the moving direction of SC-cassette SC. In this condition, the S-cassette SC is pressed against S-cassette guiding piece 105 from above by leaf springs 108, so that it will be stably held inside cassette holder 101.

When the S-cassette SC is further pushed in, the S-cassette SC presses stopper piece 105a so that cassette holder 101 slightly moves inward. As a result, 1st and 2nd slider axles 106A and 106B move whilst being guided along respective 1st and 2nd guide slots 113a and 113b. The distal ends of drive arms 114A and 114B whose slots 114b are engaged with 1st and 2nd slider axles 106A and 106B, swayingly move toward the chassis interior (in the clockwise direction in FIGS. 4A, 7C and 7D, and in the counterclockwise direction in FIG. 5). As a result, double-acting plate 118 meshed with semicircular gear 114c formed in left drive arm 114B slightly moves toward the chassis interior.

As shown in FIG. 7D, when double-acting plate 118 has moved slightly toward the chassis interior, engaging boss 106D formed in cassette holder 101 becomes engaged with slanting surface 123a of shutter 123 so as to forcibly move shutter 123 downward opposing the force of spring 124. As a result, opening 123b of shutter 123 moves into the optical path between light emitter 121 and light-receiving sensor 122 so that it allows light-receiving sensor 122 to receive the sensor light from light emitter 121. This activates an unillustrated motor whose driving force is transmitted to rack gear 119f. As a result, driving plate 119 moves toward the chassis interior to the position where abutment piece 119d abuts double-acting plate 118. Then, driving plate 119 and double-acting plate 118 move altogether toward the chassis interior.

The subsequent procedures of the loading operation as well as the ejecting operation of S-cassette SC are the same as those of L-cassette LC, therefore the description is omitted.

In the conventional cassette loading device 100 stated above, the point for staring the in-pulling operation of a cassette for loading L-cassette LC differs from that for loading S-cassette SC. This difference sometimes causes malfunctions or damage to the appliance. The following illustrates these phenomena.

In general, in a cassette loading device, the point for starting the in-pulling operation of a cassette is set up in the following manner. When the cassette is pushed in with the fingers to a position where the cassette loading switch is turned on, the cassette in-pulling operation is activated (the cassette loading switch is turned on so that an unillustrated driving motor starts to cause the driving plate 119 to perform pull-in action) if the cassette is pushed in to a predetermined position sd in order to prevent the fingers from being caught between the cassette inserting port and the cassette and injured. This predetermined position sd is typically set up in such a position that the rear end face of the cassette, with respect to the loading direction, is depressed toward the chassis interior by d (=0 to 10 mm) from the VTR front panel FP (see FIGS. 7B and 7D).

However, the two kinds, small and large types of cassettes LC and SC handled by cassette loading device 100 must be positioned so that the mouth positions of cassettes LC and SC after they have been loaded will coincide with each other. (Here, the mouth position means the reference position on the forward side in the loading direction of cassette LC or SC, which serves as the reference point for drawing out the magnetic tape.) As a result of this positioning, the rear ends, with respect to the loading direction, of the different types of cassettes are positioned with a difference D, as shown in FIG. 8, and it was impossible to avoid this.

In the conventional cassette loading device 100, the timing for the cassette in-pulling operation was set up so as to be suitable for S-cassette SC. Specifically, during the loading of an S-cassette SC, the cassette in-pulling operation is started when the rear side with respect to the cassette loading direction has reached the aforementioned predetermined position sd (see FIGS. 7B, 7D). In this case, however, during the loading of an L-cassette LC, the L-cassette LC starts to be pulled in when its rear side is located at a position ld (see FIGS. 6B and 6D), or at a distance of D' (=D−(0–10 mm)) from the VTR front panel FP. The projected amount of L-cassette LD (the distance projected from the VTR front panel) becomes too large.

For this reason, it structurally becomes possible for the user to hold the rear part of the L-cassette LC during the loading of the L-cassette LC, and draw it out or change the loading position of it despite the fact that cassette in-pulling operation has been already started. This means that the apparatus may perform the cassette in-pulling operation even with no cassette inserted, or the L-cassette LC may be displaced out of position back and forth relative to L-cassette guiding piece 104. This resulted in malfunctions and damage to the appliance.

When, during the insertion of cassette, each cassette LC and SC abuts stopper pieces 104a and 105a, the projected amounts of cassettes LC and SC from the VTR front panel FP differ, resulting in ineptness of cassette insertion and degrading the handling performance. Specifically, if the projected amount sD (see FIGS. 7A and 7C) of S-cassette SC from the VTR front panel FP when it abuts stopper piece 105a, is set optimally (at about 10 mm; this might change depending upon the size of the S-cassette SC and the aforementioned predetermined position sd), the projected amount lD (see FIGS. 6A and 6C) of L-cassette LC from the VTR front panel FP when it abuts stopper piece 104a, becomes a large value, i.e., lD=sD+D. Consequently, the projected amounts sD and lD for both the cassettes SC and LC differ considerably. This results in ineptness of cassette insertion. Besides, during the operation, the operation with L-cassette LC projected out to such a large degree is awkward and clumsy looking, degrading the handling performance.

SUMMARY OF THE INVENTION

The present invention offers the following means to solve the problems described above.

In accordance with the first aspect of the invention, a cassette loading device for handling plural kinds of magnetic tape cassettes different in outside dimensions, comprises: an inputting means which moves a magnetic tape cassette in linkage with a pushing operation of the cassette by the operator up to a position where the cassette in-pulling operation starts; and a plurality of cassette holders in conformity with the number of the plural kinds of magnetic tape cassettes to be handled, and is characterized in that the cassette holders are arranged such that one cassette holder is fitted into the other holder so as to slide in the cassette's direction of movement relative to the other.

In accordance with the second aspect of the invention, a cassette loading device having the above first feature is characterized in that the inputting means moves the other cassette holder with a different amount of stroke from the pushed amount of stroke for the magnetic tape cassette inserted in the one cassette holder.

In accordance with the third aspect of the invention, a cassette loading device having the above second feature, is characterized in that the inputting means comprises: a coupling gear which is composed of a pair of gear parts coaxially arranged with respect to each other and is rotatably attached to the one cassette holder; a first rack gear which is provided so as to be unable to move in the cassette's direction of movement and is meshed with one gear part of the coupling gear; and a second rack gear which is fixed to the other cassette holder and meshed with the other gear part of the coupling gear.

In accordance with the fourth aspect of the invention, a cassette loading device for handling plural kinds of magnetic tape cassettes different in outside dimensions, comprises: an inputting means which moves a cassette holder into which magnetic tape cassettes different in outside dimensions are selectively inserted, in linkage with a pushing operation of the magnetic tape cassette by the operator, to a position where the cassette in-pulling operation starts; a functioning member which selectively operates in accordance with the movement of the magnetic tape cassette held in the cassette holder and in accordance with the outside dimensions thereof; and a changing means which changes a position where the cassette in-pulling operation starts in the moving direction of the cassette holder, in accordance with the operating state of the functioning member.

In accordance with the fifth aspect of the invention, a cassette loading device having the above fourth feature is characterized in that the functioning member is rotationally supported at a central portion across the length, and has on one end thereof, an engaging portion which selectively engages a magnetic tape cassette inserted into the cassette holder in accordance with the outside dimensions of the cassette, and on the other end thereof, a plurality of position designating portions which are provided corresponding to the outside dimensions of the magnetic tape cassettes and are spaced from each other with respect to the moving direction of the cassette holder, while the changing means selectively detects one position designating portion at the terminal end of the movement of the cassette and starts the cassette in-pulling operation at the time of the detection.

In accordance with the sixth aspect of the invention, a cassette loading device having the above fifth feature, is characterized in that the position designating portion comprises an opening formed in the functioning member and the changing means comprises a detector optically detecting the opening.

In accordance with the seventh aspect of the invention, a cassette loading device having the above fifth feature is characterized in that the position designating portion comprises a projection formed in the functioning member and the changing means comprises a detector detecting the projection by mechanical engagement with the projection.

In accordance with the eighth aspect of the invention, a cassette loading device having the above fourth feature is characterized in that a plurality of cassette holders are provided in conformity with the number of the plural kinds of magnetic tape cassettes to be handled and are arranged such that one cassette holder is fitted into the other holder so as to slide in the cassette's direction of movement relative to the other, and the inputting means moves the other cassette holder with a different amount of stroke from the pushed amount of stroke for the magnetic tape cassette inserted in the one cassette holder.

In accordance with the ninth aspect of the invention, cassette loading device having the above fifth feature is characterized in that a plurality of cassette holders are provided in conformity with the number of the plural kinds of magnetic tape cassettes to be handled and are arranged such that one cassette holder is fitted into the other holder so as to slide in the cassette's direction of movement relative to the other, and the inputting means moves the other cassette holder with a different amount of stroke from the pushed amount of stroke for the magnetic tape cassette inserted in the one cassette holder.

In accordance with the tenth aspect of the invention, cassette loading device having the above sixth feature is characterized in that a plurality of cassette holders are provided in conformity with the number of the plural kinds of magnetic tape cassettes to be handled and are arranged such that one cassette holder is fitted into the other holder so as to slide in the cassette's direction of movement relative to the other, and the inputting means moves the other cassette holder with a different amount of stroke from the pushed amount of stroke for the magnetic tape cassette inserted in the one cassette holder.

In accordance with the eleventh aspect of the invention, a cassette loading device having the above seventh feature is characterized in that a plurality of cassette holders are provided in conformity with the number of the plural kinds of magnetic tape cassettes to be handled and are arranged such that one cassette holder is fitted into the other holder so as to slide in the cassette's direction of movement relative to the other, and the inputting means moves the other cassette holder with a different amount of stroke from the pushed amount of stroke for the magnetic tape cassette inserted in the one cassette holder.

In accordance with the twelfth aspect of the invention, a cassette loading device having the above eighth feature is characterized in that the inputting means comprises: a coupling gear which is composed of a large-diametric gear part and a small-diametric gear part coaxially arranged with respect to each other and is rotatably attached to the one cassette holder; a first rack gear which is provided so as to be unable to move in the cassette's direction of movement and meshed with the large-diametric gear part; and a second rack gear which is fixed to the other cassette holder and meshed with the small-diametric gear part of the coupling gear.

In accordance with the thirteenth aspect of the invention, a cassette loading device having the above ninth feature is characterized in that the inputting means comprises: a coupling gear which is composed of a large-diametric gear part and a small-diametric gear part coaxially arranged with respect to each other and is rotatably attached to the one cassette holder; a first rack gear which is provided so as to be unable to move in the cassette's direction of movement and meshed with the large-diametric gear part; and a second rack gear which is fixed to the other cassette holder and meshed with the small-diametric gear part of the coupling gear.

In accordance with the fourteenth aspect of the invention, a cassette loading device having the above tenth feature is characterized in that the inputting means comprises: a coupling gear which is composed of a large-diametric gear part and a small-diametric gear part coaxially arranged with respect to each other and is rotatably attached to the one cassette holder; a first rack gear which is provided so as to be unable to move in the cassette's direction of movement and meshed with the large-diametric gear part; and a second rack gear which is fixed to the other cassette holder and meshed with the small-diametric gear part of the coupling gear.

In accordance with the fifteenth aspect of the invention, a cassette loading device having the above eleventh feature is characterized in that the inputting means comprises: a coupling gear which is composed of a large-diametric gear part and a small-diametric gear part coaxially arranged with respect to each other and is rotatably attached to the one cassette holder; a first rack gear which is provided so as to be unable to move in the cassette's direction of movement and meshed with the large-diametric gear part; and a second rack gear which is fixed to the other cassette holder and meshed with the small-diametric gear part of the coupling gear.

BRIEF DESCRIPTION OF THE DRAWINGS

FIG. 26 is an exploded perspective view showing the cassette holders of the 5th embodiment;

DESCRIPTION OF THE PREFERRED EMBODIMENTS

The 1st embodiment

Figure 1A:
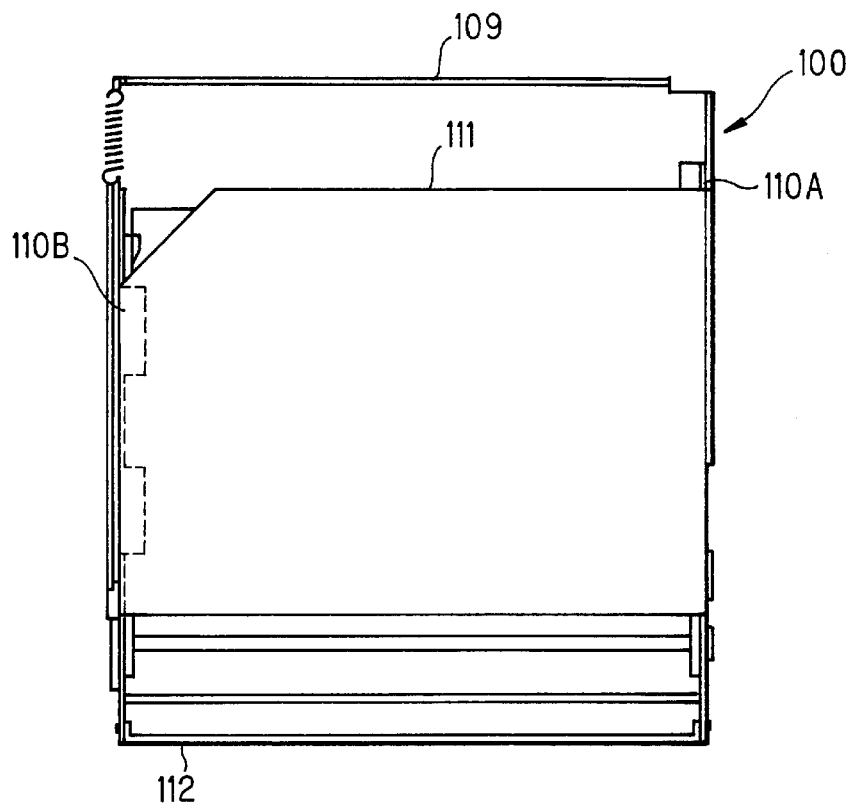
FIG. 1A is a plan view showing a conventional cassette loading example.
Figure 1B:
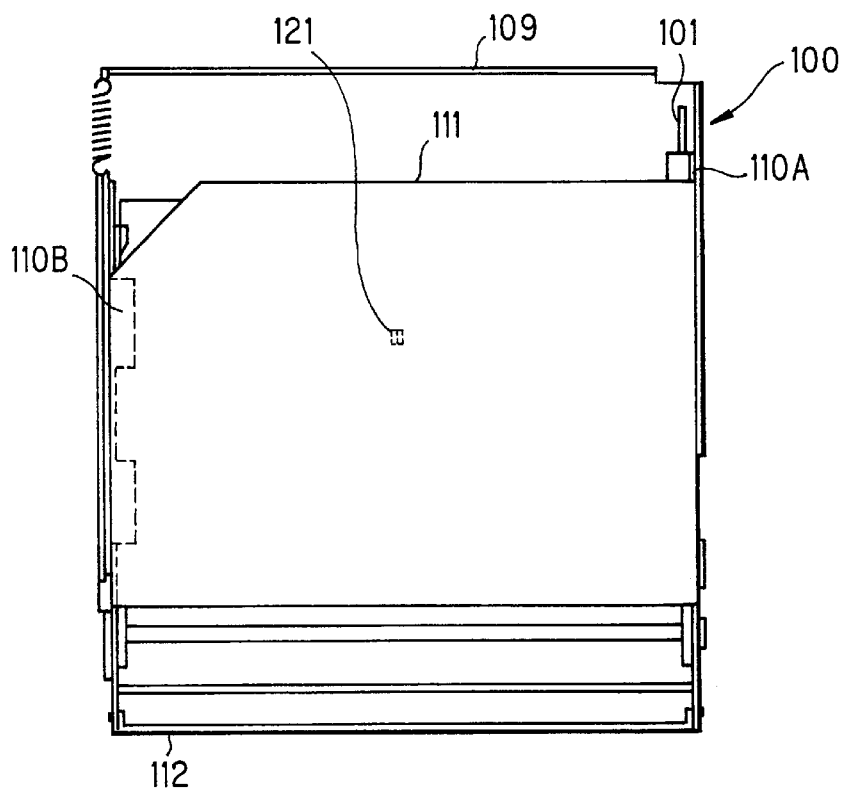
FIG. 1B is a plan view showing another conventional cassette loading example.

One embodiment of the invention will be described hereinbelow with reference to the drawings.

A cassette loading device 1 comprises an L-cassette holder 2 and an S-cassette holder 3 as shown in FIGS. 9–13. S-cassette holder 3 is made to fit on L-cassette holder 2 in a slidable manner along the cassette's direction of movement.

L-cassette holder 2 is integrally formed of a top portion 4, left and right side portions 5, and L-cassette guiding pieces 6 for guiding the undersurface of L-cassette LC. L-cassette guiding piece 6 has a stopper piece 6a which has been formed upright to bear the front part of L-cassette LC. Leaf springs 7 for pressing L-cassette are press fitted in top portion 4. The distance between left and right L-cassette guiding pieces 6 is set equal to or greater than the width of S-cassette SC.

Provided for side portions 5 are bosses 8 projecting outwards. L-holder side plates 9 are fixed to bosses 8 with screws. A coupling gear 10 and a fixed rack guiding boss 11 are provided on the inner side of L-holder side plate 9. Coupling gear 10 is composed of two different-sized gears having different pitch circle diameters, a large-diametric gear part 10a and a small-diametric gear part 10b integrally formed concentrically, and is attached rotatably to L-holder side plate 9. Provided on the outer side of L-holder side plate 9 are 1st to 3rd slider axles 12A, 12B and 12C and a sensor engagement projection 9b. A guide slot 9a extending horizontally is formed in L-holder side plate 9. Here, sensor engagement projection 9b is provided only on one L-holder side plate (the left one in FIG. 11) 9, while mech-chassis 19 has a cassette loading switch 31 (see FIGS. 14A–14C, FIGS. 15A–15C) which is engaged with this sensor engagement projection 9b.

A fixed rack 13 is provided between side portion 5 and L-holder side plate 9. Fixed rack 13 has a first rack gear 13a meshing large-diametric gear part 10a, a guide slot 13b engaged with fixed rack guide boss 11 and a position regulating boss 13c.

S-cassette holder 3 is composed of a top portion 14, left and right side portions 15 and S-cassette guiding pieces 16 for guiding the undersurface of S-cassette SC. S-cassette guiding piece 16 has a stopper piece 16a which has been formed upright to bear the front part of S-cassette SC. Leaf springs 17 for pressing S-cassette are press fitted in top portion 14.

Fixed on the outer face of side portion 15 is a movable rack 18, which has a 2nd rack gear 18a and a sliding bosses 18b. Second rack gear 18a is meshed with small-diametric gear part 10b of coupling gear 10. Sliding bosses 18b engage with guide slot 9a of L-holder side plate 9.

Provided for top portion 4 of L-cassette holder 2 are clearance holes 4a for leaf springs 17 on S-cassette holder 3.

Mech-chassis 19 which supports cassette loading device 1, has a pair of right and left frames 20A and 20B standing upright parallel to each other. Each frame 20A and 20B has integrally formed, inwardly bent flanges 20a on the upper edge thereof. A top plate 21 supported by these flanges 20a, is provided between frames 20A and 20B. Pivotally supported between frames 20A and 20B is a cassette port door 22 for opening and closing the port for both cassette holders 2 and 3. Cassette port door 22 is biased toward the closed direction by an unillustrated door shutting spring.

Frames 20A and 20B each have a 1st L-shaped guide slot 23a engaged with and guiding the 1st slider axle 12A of L-cassette side plate 9, and a 2nd L-shaped guide slot 23b engaged with and guiding 2nd slider axle 12B, whereby L-cassette side plate 9 is supported so as to be able to slide along guide slots 23a and 23b. Further, frames 20A and 20B each include: a rib-formed guide slot 23c which is engaged with 3rd slider axle 12C to guide the downward movement when both cassette holders 2 and 3 move downwards; and a guide slot 23d which guides position regulating boss 13c of fixed rack 13 in the vertical direction and inhibits the motion in the cassette's direction of movement.

Drive arms 24A and 24B are pivoted on the inner sides of respective frames 20A and 20B so that they are free to rock back and forth. Drive arms 24A and 24B each have a semicircular gear 24a formed coaxially with the support axle thereof. Rotationally supported between left and right frames 20A and 20B is a link shaft 25. This link shaft 25 has timing gears 26, 26 attached at both ends in phase. Timing gears 26, 26 are in mesh with semicircular gears 24a of drive arms 24A and 24B, respectively, so that both drive arms 24A and 24B will rotate integrally.

Drive arms 24A and 24B have respective slots 24b, 24b, which extend along the length thereof. This slot 24b is engaged with 1st slider axle 12A which also fits through 1st guide slot 23a. Left drive arm 24B has another semicircular gear 24c which is formed coaxially with the support axle of drive arm 24B. Drive arms 24A and 24B each have a cassette pressing spring 24d which urges 1st slider axle 12A engaging slot 24b, in such a direction as to press the distal end of drive arm 24A or 24B toward the chassis interior (in the clockwise direction in FIG. 12, and in the counterclockwise direction in FIG. 13).

The outer side of left frame 20B has 4th through 6th slider axles 27A, 27B and 27C press fitted thereon. A double-acting plate 28 is provided on the outer side of left frame 20B. Double-acting plate 28 has guide slots 28a, 28b and 28c which are engaged with 4th through 6th slider axles 27A to 27C, respectively, so that double-acting plate 28 will be able to move back and forth relative to frame 20B in the cassette's direction of insertion. Double-acting plate 28 has a rack gear 28d meshed with semicircular gear 24c of drive arm 24B so that double-acting plate 28 will move linearly in the cassette's direction of insertion as drive arm 24B moves swayingly.

Provided on the outer side of double-acting plate 28 is a driving plate 29, which has guide slots 29a, 29b and 29c engaged with 4th through 6th slider axles 27A to 27C, respectively. By this arrangement, driving plate 29 will be able to move back and fourth relative to frame 20B in the cassette's direction of insertion.

A double-acting spring 30, a tension spring is provided between double-acting plate 28 and driving plate 29 at their inner ends thereof. Formed on the near end, with respect to the cassette's direction of movement, of driving plate 29 is an abutment piece 29d which is bent toward double-acting plate 28 so that it will abut double-acting plate 28. Driving plate 29 has a rack gear 29e which, similarly to rack gear 28d, is in mesh with semicircular gear 24c, and another rack gear 29f which receives the driving force from an unillustrated driver motor for loading.

Rack gear 28d is formed with such a length as to be in mesh with semicircular gear 24c from the beginning of the rocking movement of drive arm 24B to the end. Rack gear 29e is formed with such a length that it will not be in mesh at the beginning of the rocking movement of drive arm 24B but will become engaged with semicircular gear 24c of drive arm 24B in the course of rocking movement of the arm to the end.

In cassette loading device 1 thus configured, since fixed rack 13 is inhibited from moving in the cassette's direction of movement by guide slot 23d, when L-cassette holder 2 is moved, S-cassette holder 3 will also move through coupling gear 10 and fixed rack 13. In this case, S-cassette holder 3 undergoes extra movement compared to L-cassette holder 2, corresponding to the ratio of the pitch circle diameters of large-diametric gear part 10a and small-diametric gear part 10b. If, for example, large- and small-diametric gear parts 10a and 10b have the same pitch circle diameter, or the ratio of the pitch circle diameters is set at 1:1, the moving ratio of L-cassette holder 2 and S-cassette holder 3 becomes equal to 1:2. If the ratio of the pitch circle diameters is set at 1:2, the moving ratio becomes equal to 2:3. In this way, the ratio of the pitch circle diameters for 10a and 10b can be changed so as to optimize the travel distance of S-cassette holder 3 relative to L-cassette holder 2.

Here, in order for the positioning holes provided in L- and S-cassettes LC and SC to reach identical alignment, it should be noted that the inner end position of L-cassette holder 2 on the chassis interior side and that of S-cassette holder 3 must be made coincident at the terminal position of horizontal conveyance. In a horizontal conveyance mechanism for cassette holder using coupling gear 10 as stated above, when the mechanism is constructed so that, at the terminal position of horizontal conveyance, the inner end position of L-cassette holder 2 on the chassis interior side is made coincident with that of S-cassette holder 3, the ends of the cassette holders on the chassis interior side will be located at different points when they are at the starting positions in the horizontal conveyance. Specifically, the end on the chassis interior side of L-cassette holder 2 will be located at a more inward position relative to the chassis interior than that of S-cassette holder 3 (see FIGS. 14A and 15A).

The horizontal conveyance starts from the inserted positions of L- and S-cassettes LC and SC (at the positions where cassettes LC and SC abut stopper pieces 6a and 16a, respectively). Since the L-cassette holder 2 is located at a more inward position relative to the chassis interior, it is possible to reduce the projected amount (designated at LD in FIG. 14A) of L-cassette LC at its inserted position from the VTR front panel FP. Further, by adjusting the ratio of the pitch circle diameters of large-diametric gear part 10a and small-diametric gear part 10b, the projected amount (designated at SD in FIG. 15A) of S-cassette SC at its inserted position from the VTR front panel FP can be made coincident with the aforementioned projected amount LD.

Figure 14A:
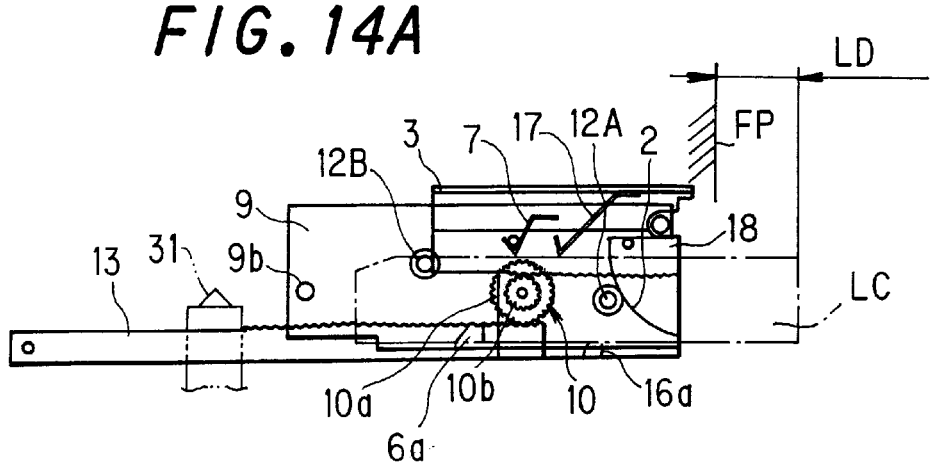
FIGS. 14A–14C are views showing the steps of the loading operation of an L-cassette in the embodiment.
Figure 14B:
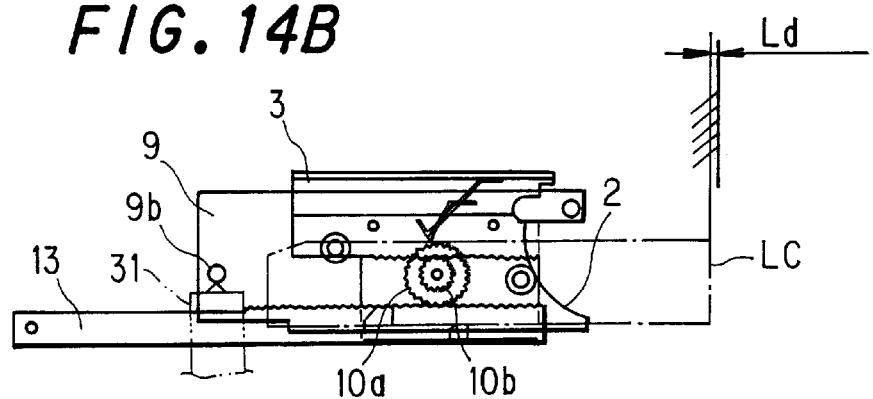
Figure 14C:
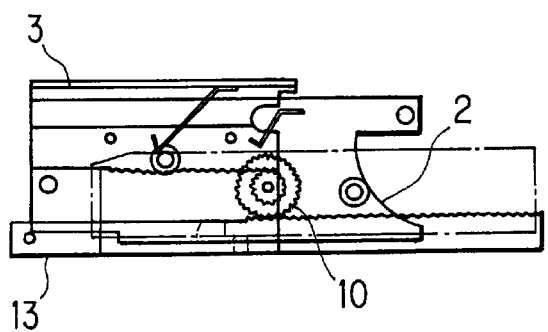

Referring next to FIGS. 14A–14C, the loading operation of an L-cassette LC will be described. First, as shown in FIG. 14A, an L-cassette LC is inserted from an unillustrated inserting port so that it is placed on L-cassette guiding piece 6 of cassette holder 2. A further insertion of the L-cassette LC into the chassis interior makes it abut stopper piece 6a, on its inner side edge. In this condition, the L-cassette LC is pressed against L-cassette guiding piece 6 from above by leaf springs 17, so that it will be stably held inside L-cassette holder 2.

When the L-cassette LC is further pushed in, the L-cassette LC engages and presses stopper piece 6a so that L-cassette holder 2 slightly moves toward the chassis interior. At that moment, coupling gear 10 moves together with L-cassette holder 2. As L-cassette holder 2 moves, coupling gear 10 moves with large-diametric gear part 10a rolling in mesh with 1st rack gear 13a.

Movable rack 18 (S-cassette holder 3), which is placed on in mesh with coupling gear 10, also moves horizontally, as coupling gear 10 travels horizontally. In this operation, movable rack 18 (S-cassette holder 3) meshed with small-diametric gear part 10b turned by the rolling of coupling gear 10, moves further toward the chassis interior as it rolls over small-diametric gear part 10b. Therefore, S-cassette holder 3 travels further, which is the distance in which movable rack 18 moves over the rolling small-diametric gear part 10b, than L-cassette holder 2.

During this, L-holder side plate 9 is guided with its 1st and 2nd slider axles 12A and 12B engaging 1st and 2nd guide slots 23a and 23b of frames 20A and 20B.

Figure 12:
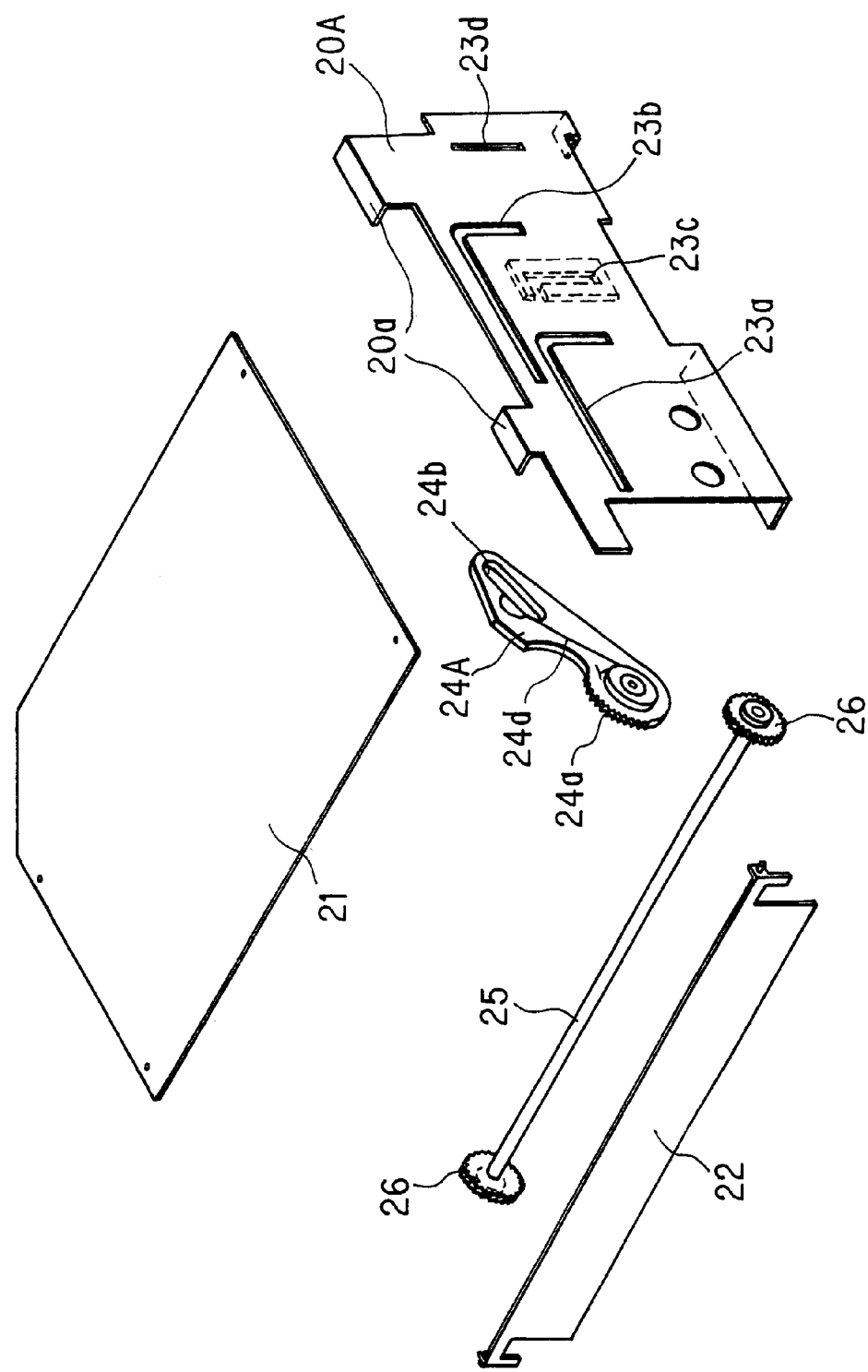
FIG. 12 is an exploded perspective view showing essential parts of the embodiment.
Figure 13:
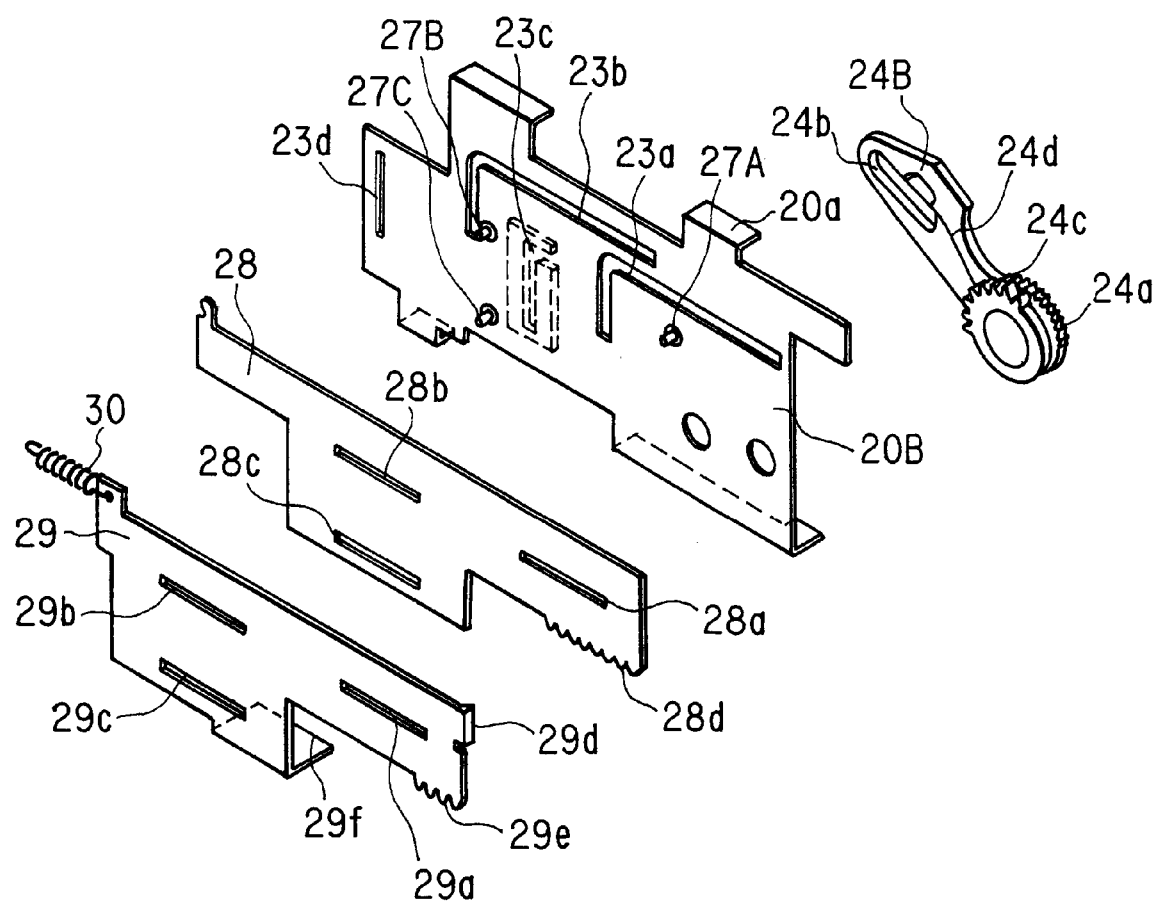
FIG. 13 is an exploded perspective view showing essential parts of the embodiment.

Further, when 1st slider axles 12A move toward the chassis interior, drive arms 24A and 24B whose slots 24b are engaged with 1st slider axles 12A, swayingly move their distal ends toward the chassis interior (in the clockwise direction in FIG. 12, and in the counterclockwise direction in FIG. 13). Since drive arms 24A and 24B are coupled by link shaft 25, timing gears 26, 26 and semicircular gears 24a, they will sway in synchronism.

As drive arm 24B sways, double-acting plate 28 meshed with semicircular gear 24c moves slightly toward the chassis interior. During this, since driving plate 29 will not move, double-acting plate 28 will move whilst extending double-acting spring 30 provided between double-acting plate 28 and driving plate 29.

Then, when double-acting plate 28 has moved to the position shown in FIG. 14B, sensor engagement projection 9b provided for L-holder side plate 9, turns on cassette loading switch 31 (from the OFF state to the ON state). This activates an unillustrated motor, and this driving force is transmitted through rack gear 29f so as to move driving plate 29 toward the chassis interior. When driving plate 29 has moved toward the chassis interior to make abutment piece 29d abut the near end, relative to the chassis, of double-acting plate 28, double-acting plate 28 together with driving plate 29 begins moving toward the chassis interior. Thus, the cassette in-pulling operation is commenced. At this moment, the rear side surface of L-cassette LC with respect to the cassette's direction of movement, is located at a position by a small distance Ld (see FIG. 14B), depressed toward the chassis interior, from the VTR front panel FP. Therefore, there is no possibility that the fingers might be nipped between the L-cassette LC and the cassette inserting port (not shown), and also it is no longer possible for the operator to make such an erroneous operation as to draw out the L-cassette LC despite the fact that the cassette in-pulling operation has been already started.

When double-acting plate 28 is moved toward the chassis interior by driving plate 29, drive arm 24B whose semicircular gear 24c is meshed with rack gear 28d of double-acting plate 28, sways in such a direction that the distal end thereof moves toward the chassis interior (in the counterclockwise direction in FIG. 13) while drive arm 24A also sways in synchronism.

Then, 1st slider axles 12A, 12A engaging slots 24b and 24b of drive arms 24A and 24B move toward the chassis interior. With this movement, L-cassette holder 2 moves together with the L-cassette LC toward the chassis interior. During this operation, L-cassette holder 2 is guided by the engagement of 1st and 2nd slider axles 12A and 12B with 1st and 2nd guide slots 23a and 23b.

In this way, while L-cassette holder 2 moving toward the chassis interior, an unillustrated cassette size detecting switch detects the inserted cassette as to be an L-cassette LC, to thereby drive an unillustrated reel table shifting mechanism. In this way, the reel tables are adjusted so that the distance between the reel tables will match the reel distance of L-cassette LC.

When L-cassette holder 2 further moves toward the chassis interior so as to reach the position shown in FIG. 14C, 1st and 2nd slider axles 12A, 12B will reach the vertically slotted portions of 1st and 2nd guide slots 23a and 23b, and 3rd slider axles 12C will become engaged with rib-formed guide slots 23c, though this is not illustrated. Then, drive arms 24A and 24B press 1st slider axles 12A downward along the vertically slotted portions of 1st guide slots 23a. With this movement, 2nd slider axles 12B move downwards along the vertically slotted portions of 2nd guide slots 23b while 3rd slider axles 12C move downwards along rib-formed guide slots 23c. As a result, L-cassette holder 2 will move downwards together with the L-cassette LC. During this, fixed rack 13 moves downwards together with L-cassette holder 2 since position regulating bosses 13c are guided along guide slots 23d.

The L-cassette LC, which already has been pulled in to the lowest position of the in-pulling operation, is placed on four cassette stays (not shown) planted on mech-chassis 19. In this condition, drive arms 24A and 24B urged by cassette pressing springs 24d press 1st slider axles 12A downwards. Therefore, the L-cassette LC becomes pressed in contact with the aforementioned cassette stays with its bottom slightly spaced away from L-cassette guiding piece 6.

Thus, the loading operation of L-cassette LC is completed. The ejecting operation of L-cassette LC is effected in the reverse order of the aforementioned loading operation.

Figure 15A:
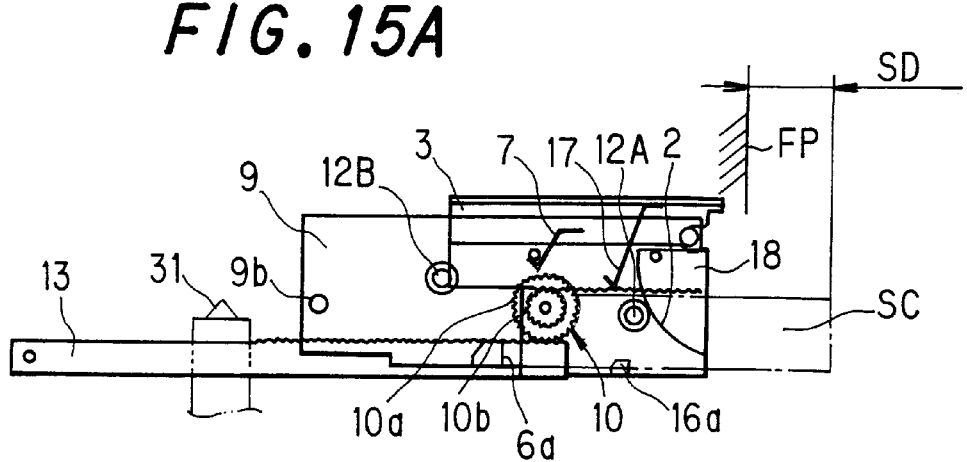
FIGS. 15A–15C are views showing the steps of the loading operation of an S-cassette in the embodiment.
Figure 15B:
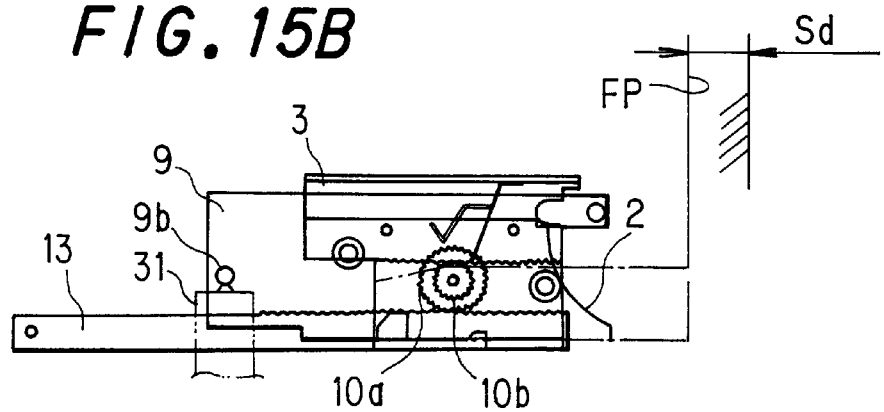
Figure 15C:
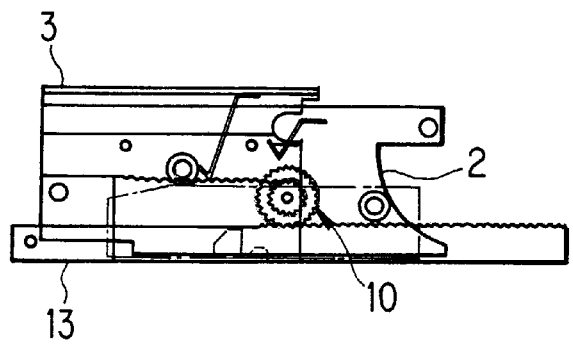

Referring next to FIGS. 15A–15C, the loading operation of an S-cassette SC will be described. First, as shown in FIG. 15A, an S-cassette SC is inserted from an unillustrated inserting port so that it is placed on S-cassette guiding piece 16 of cassette holder 3. A further insertion of the S-cassette SC into the chassis interior makes the inner side edge thereof abut stopper piece 16a of S-cassette guiding piece 16. In this condition, the S-cassette SC is pressed against S-cassette guiding piece 16 from above by leaf springs 17, so that it will be stably held inside S-cassette holder 3.

When the S-cassette SC is further pushed in, the S-cassette SC engages and presses stopper piece 16a so that S-cassette holder 3 slightly moves toward the chassis interior. As a result, coupling gear 10 with its small-diametric gear part 10b in mesh with 2nd rack gear 18a of movable rack 18, turns to roll over the fixed rack 13 through large-diametric gear part 10a. Therefore, L-holder side plate 9 and L-cassette holder 2 which are integrally coupled with coupling gear 10 travel toward the chassis interior by the distance in which coupling gear 10 rolls. S-cassette holder 3 placed on coupling gear 10 also moves by the distance in which coupling gear 10 moves toward the chassis interior. Therefore, as S-cassette holder 3 is pushed in, L-cassette holder 2 also moves, but S-cassette holder 3 is moved more than L-cassette holder 2.

During this movement, L-holder side plate 9 is guided with its 1st and 2nd slider axles 12A and 12B engaging 1st and 2nd guide slots 23a and 23b of frames 20A and 20B.

Further, when 1st slider axles 12A move toward the chassis interior, drive arms 24A and 24B whose slots 24b are engaged with 1st slider axles 12A, swayingly move their distal ends toward the chassis interior (in the clockwise direction in FIG. 12, and in the counterclockwise direction in FIG. 13). Since drive arms 24A and 24B are coupled by link shaft 25, timing gears 26, 26 and semicircular gears 24a, they will sway in synchronism.

As drive arm 24B sways, double-acting plate 28 meshed with semicircular gear 24c moves slightly toward the chassis interior. During this, since driving plate 29 will not move, double-acting plate 28 will move whilst extending double-acting spring 30 provided between double-acting plate 28 and driving plate 29.

Then, when double-acting plate 28 has moved to the position shown in FIG. 15B, sensor engagement projection 9b provided for L-holder side plate 9, turns on cassette loading switch 31 (from the OFF state to the ON state). This activates an unillustrated motor, and this driving force is transmitted through rack gear 29f so as to move driving plate 29 toward the chassis interior. When driving plate 29 has moved toward the chassis interior to make abutment piece 29d abut the near end, with respect to the cassette loading direction, of double-acting plate 28, double-acting plate 28 together with driving plate 29 begins moving toward the chassis interior.

At this moment, the rear side of S-cassette SC with respect to the cassette loading direction, is located at a position by a small distance Sd (see FIG. 15B), depressed toward the chassis interior, from the VTR front panel FP. Therefore, there is no possibility that the fingers might be nipped between the S-cassette SC and the cassette inserting port (not shown), and also it is no longer possible for the operator to make such an erroneous operation as to draw out the S-cassette SC despite the fact that cassette in-pulling operation has been already started.

When double-acting plate 28 is moved toward the chassis interior by driving plate 29, drive arm 24B whose semicircular gear 24c is meshed with rack gear 28d of double-acting plate 28, sways in such a direction that the distal end thereof moves toward the chassis interior (in the counterclockwise direction in FIG. 13) while drive arm 24A also sways in synchronism.

Then, 1st slider axles 12A, 12A engaging slots 24b and 24b of drive arms 24A and 24B move toward the chassis interior. With this movement, S-cassette holder 3 moves together with the S-cassette SC toward the chassis interior. During this, S-cassette holder 3 is guided by the engagement of 1st and 2nd slider axles 12A and 12B with 1st and 2nd guide slots 23a and 23b.

In this way, while S-cassette holder 3 moving toward the chassis interior, an unillustrated cassette size detecting switch detects the inserted cassette as to be an S-cassette SC, to thereby drive an unillustrated reel table shifting mechanism. In this way, the reel tables are adjusted so that the distance between the reel tables will match the reel distance of S-cassette SC.

When S-cassette holder 3 further moves toward the chassis interior so as to reach the position shown in FIG. 15C, 1st and 2nd slider axles 12A, 12B will reach the vertically slotted portions of 1st and 2nd guide slots 23a and 23b, and 3rd slider axles 12C will become engaged with rib-formed guide slots 23c, though this is not illustrated. Then, drive arms 24A and 24B press 1st slider axles 12A downward along the vertically slotted portions of 1st guide slots 23a. With this movement, 2nd slider axles 12B move downwards along the vertically slotted portions of 2nd guide slots 23b while 3rd slider axles 12C move downwards along rib-formed guide slots 23c. As a result, S-cassette holder 3 will move downwards together with the S-cassette SC. During this, fixed rack 13 moves downwards together with S-cassette holder 3 since position regulating bosses 13c are guided along guide slots 23d.

The S-cassette SC, which already has been pulled in to the lowest position of the in-pulling operation, is placed on four cassette stays (not shown) planted on mech-chassis 19. In this condition, drive arms 24A and 24B urged by cassette pressing springs 24d press 1st slider axles 12A downwards. Therefore, the S-cassette SC becomes pressed in contact with the aforementioned cassette stays with its bottom slightly spaced away from S-cassette guiding piece 16.

Thus, the loading operation of S-cassette SC is completed. The ejecting operation of S-cassette SC is effected in the reverse order of the aforementioned loading operation.

In the above mode of the embodiment, although 1st to 3rd slider axles 12A to 12C are provided for L-cassette holder 2 so as to drive it by means of drive arms 24A and 24B, these 1st to 3rd slider axles 12A to 12C may be provided in S-cassette holder 3.

Further, in the above mode of the embodiment, S-cassette holder 3 is arranged in such a manner as to enclose L-cassette holder 2, but it is also possible to make such an arrangement that L-cassette holder 2 encloses S-cassette holder 3.

The 2nd embodiment

As shown in FIGS. 16 to 21, a cassette loading device 201 has a cassette holder 202, which is integrally formed of a top portion 203, left and right side portions 204, and L-cassette guiding pieces 205 for guiding the undersurface of L-cassette LC. L-cassette guiding piece 205 has an integrally formed S-cassette guiding piece 206 at its distal end. L-cassette guiding piece 205 has a stopper piece 205a which has been formed upright to bear the front part, with respect to the cassette's direction of movement, of L-cassette LC. Further, S-cassette guiding piece 206 has a stopper piece 206a which has been formed upright to bear the front part, with respect to the cassette's direction of movement, of S-cassette SC. The L-cassette guiding piece 205 on the right in FIG. 18 has an opening 205b (see FIG. 21) into which an aftermentioned timing change lever 208 is fitted.

Each side portion 204 has 1st through 3rd slider axles 207A, 207B, 207C and a boss 207D press fitted. Boss 207D is provided on only the side portion 204 located on the right side in FIG. 18. Timing change lever 208 is pivotally attached to boss 207D. Timing change lever 208 is supported at the central portion across its width by boss 207D.

An end portion, designated at 208a, on the near side, with respect to the cassette's direction of insertion, of timing change lever 208 is bent so as to fit along the bottom surface of L-cassette guiding piece 205. Further, a distal end 208b of end portion 208a is bent upward so that it can be fitted through opening 205b of L-cassette guiding piece 205. Since opening 205b is provided in L-cassette guiding piece 205, distal end 208b will engage the bottom of the L-cassette LC only when an L-cassette LC is loaded to cassette holder 202, whereas it will not engage the bottom of the S-cassette SC when an S-cassette SC is loaded.

Another end portion 208c of timing change lever 208 on the inner side with respect to the cassette's direction of insertion is formed in an L-shape and is positioned below side portion 204. This end portion 208c has a 1st opening 208d and a 2nd opening 208e. First and second openings 208d and 208e are arranged along the length of end portion 208c. Timing change lever 208 thus configured is urged by a spring 209 in such a direction that its distal end 208b projects from opening 205b (in clockwise direction in FIGS. 18 and 21).

Leaf springs 210 and 211 for pressing L-cassette and S-cassette, respectively are press fitted in top portion 203.

A mech-chassis 212 which supports cassette loading device 201, has a pair of right and left frames 213A and 213B standing upright parallel to each other. Each frame 213A and 213B has integrally formed, inwardly bent flanges 213a on the upper edge thereof. A top plate 214 supported by these flanges 213a, is provided between frames 213A and 213B. Pivotally supported between frames 213A and 213B is a cassette port door 215 for opening and closing the port of cassette holder 202. Cassette port door 215 is biased toward the closed direction by an unillustrated door shutting spring.

Frames 213A and 213B each have a 1st L-shaped guide slot 216a engaged with and guiding 1st slider axle 207A of cassette holder 202, and a 2nd L-shaped guide slot 216b engaged with and guiding 2nd slider axle 207B, whereby cassette holder 202 is supported so as to be able to slide along guide slots 216a and 216b. Further, frames 213A and 213B each have a rib-formed guide slot 216c which is engaged with 3rd slider axle 207C to guide the downward movement of cassette holder 202 when it moves downwards (to be described later).

Drive arms 217A and 217B are pivoted on the inner sides of respective frames 213A and 213B so that they are free to rock back and forth. Drive arms 217A and 217B each have a semicircular gear 217a formed coaxially with the support axle thereof. Rotationally supported between left and right frames 213A and 213B is a link shaft 218. This link shaft 218 has timing gears 219, 219 attached at both ends in phase. Timing gears 219, 219 are meshed with semicircular gears 217a of drive arms 217A and 217B, respectively, so that both drive arms 217A and 217B will sway integrally.

Drive arms 217A and 217B have respective slots 217b, which extend along the length thereof. This slot 217b is engaged with 1st slider axle 207A which also fits through 1st guide slot 216a. Left drive arm 217B has another semicircular gear 217c which is formed coaxially with the support axle of drive arm 217B. Drive arms 217A and 217B each have a cassette pressing spring 217d which urges 1st slider axle 207A engaging slot 217b, in such a direction as to press the distal end of drive arm 217A or 217B toward the chassis interior (in the clockwise direction in FIG. 19 and in the counterclockwise direction in FIG. 20). The outer side of left frame 213B has 4th through 6th slider axles 220A, 220B and 220C press fitted thereon.

A double-acting plate 221 is provided on the outer side of left frame 213B. Double-acting plate 221 has guide slots 221a, 221b and 221c which are engaged with 4th through 6th slider axles 220A to 220C, respectively, so that double-acting plate 221 will be able to move back and forth relative to frame 213B in the cassette's direction of movement. Double-acting plate 221 has a rack gear 221d meshed with semicircular gear 217c of drive arm 217B so that double-acting plate 221 will move linearly in the cassette's direction of insertion as drive arm 217B moves swayingly.

Provided on the outer side of double-acting plate 221 is a driving plate 222, which has guide slots 222a, 222b and 222c engaged with 4th through 6th slider axles 220A to 220C, respectively. By this arrangement, driving plate 222 will be able to move back and fourth relative to frame 213B in the cassette's direction of movement.

A double-acting spring 223, a tension spring is provided between double-acting plate 221 and driving plate 222 at their inner ends thereof. Formed on the near end of driving plate 222 is an abutment piece 222d which is bent toward double-acting plate 221 so that it will abut double-acting plate 221. Driving plate 222 has a rack gear 222e which, similarly to rack gear 221d, is in mesh with semicircular gear 217c and another rack gear 222f which receives the driving force from an unillustrated driver motor for loading.

Rack gear 221d is formed with such a length as to be in mesh with semicircular gear 217c from the beginning of the rocking movement of drive arm 217B to the end. Rack gear 222e is formed with such a length that it will not be in mesh at the beginning of the rocking movement of drive arm 217B but will become engaged with semicircular gear 217c by of drive arm 217B in the course of rocking movement of the arm to the end.

Figure 16:
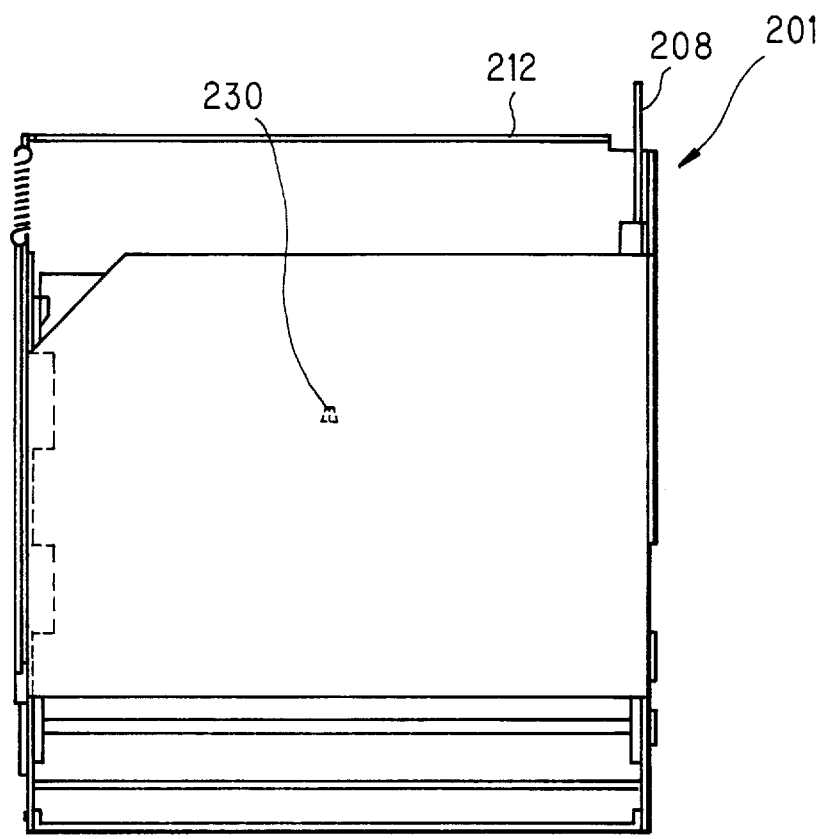
FIG. 16 is a plan view showing a cassette loading device in accordance with the 2nd embodiment of the invention.
Figure 17:
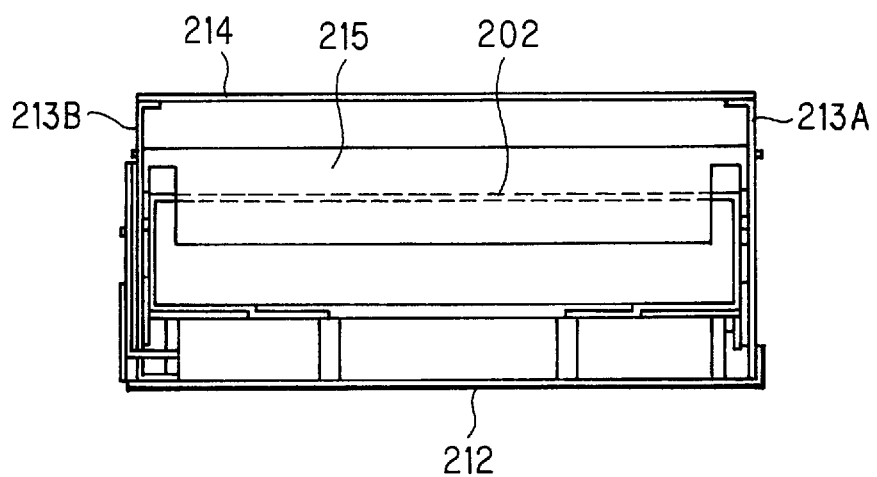
FIG. 17 is a front view showing the cassette loading device of the 2nd embodiment.
Figure 18:
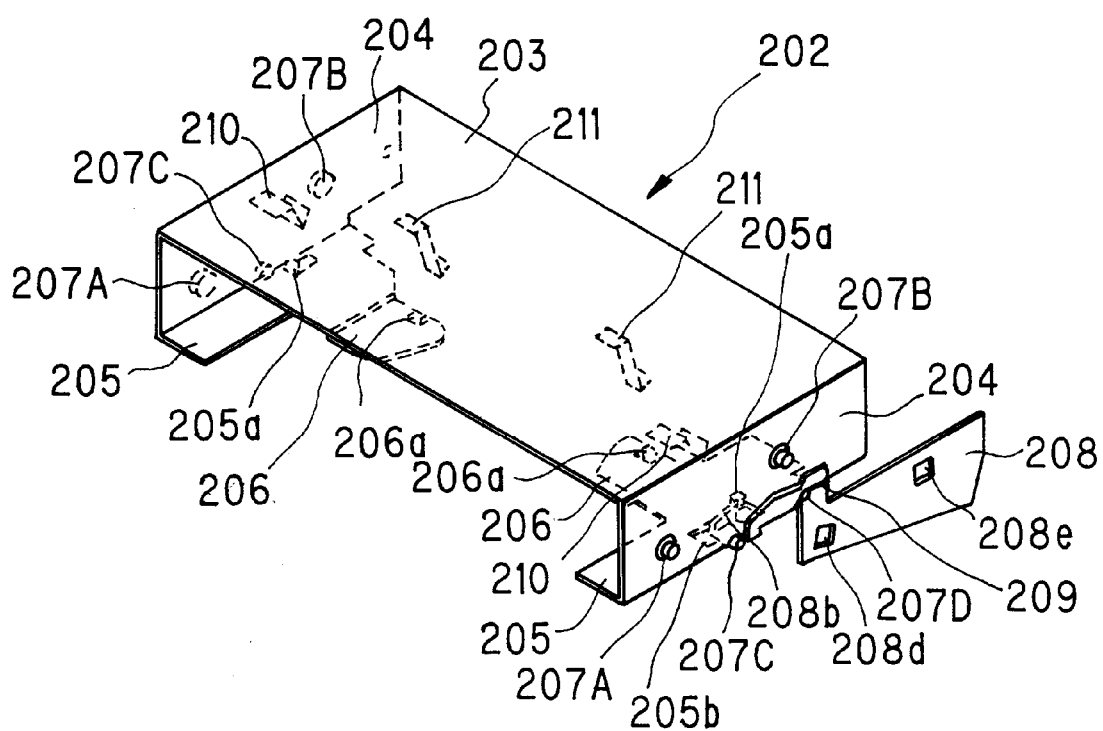
FIG. 18 is an exploded perspective view showing the cassette holders of the 2nd embodiment.
Figure 19:
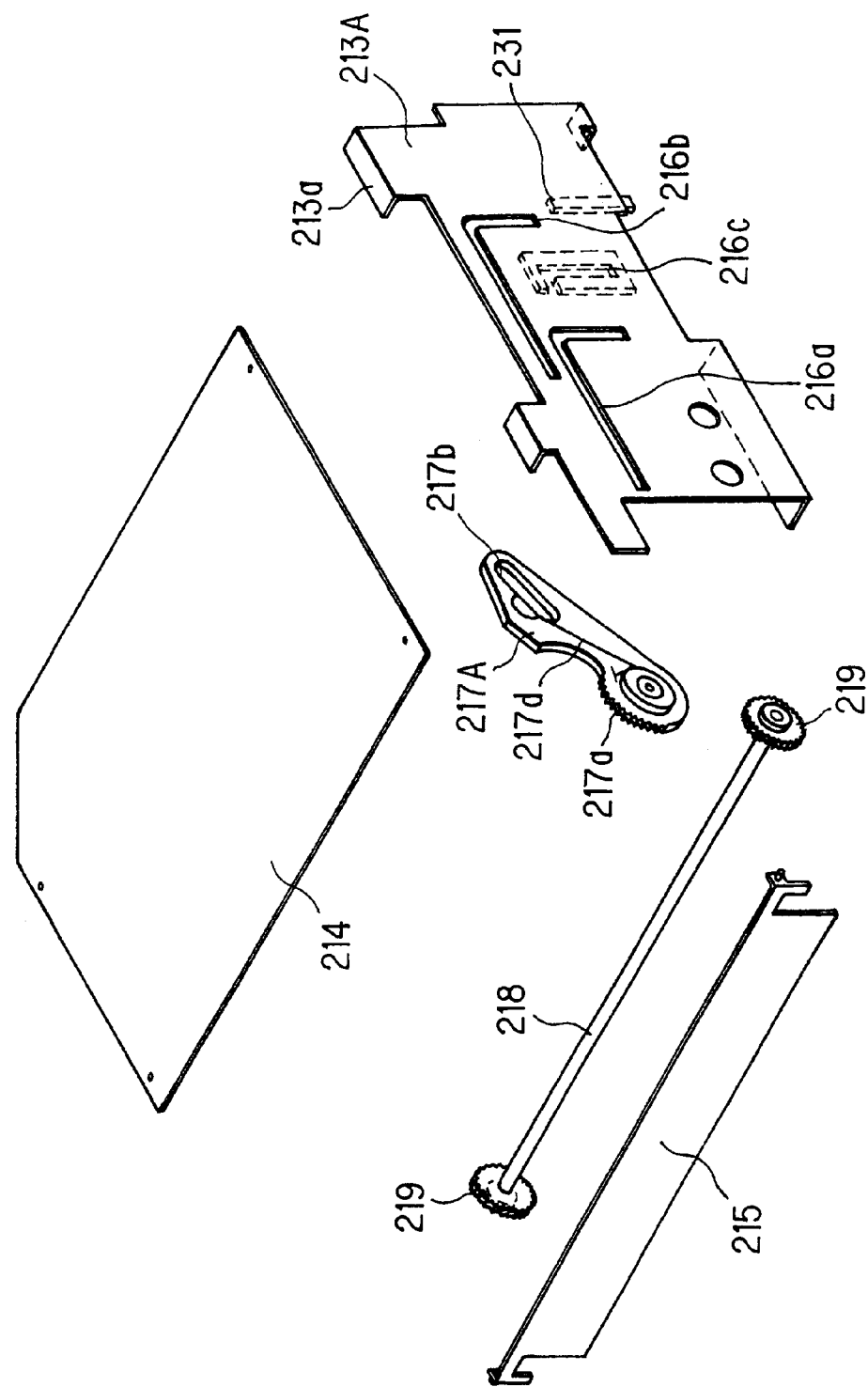
FIG. 19 is an exploded perspective view showing essential parts of the 2nd embodiment.
Figure 20:
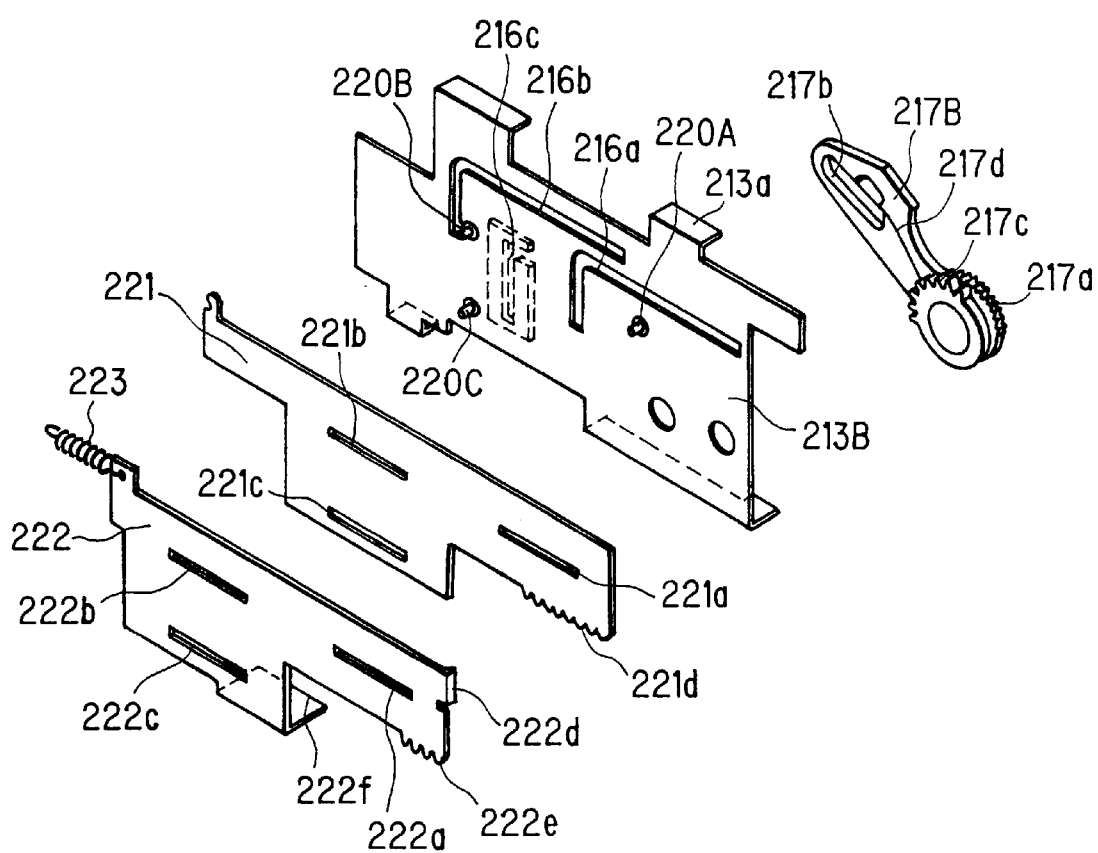
FIG. 20 is an exploded perspective view showing essential parts of the 2nd embodiment.
Figure 21:
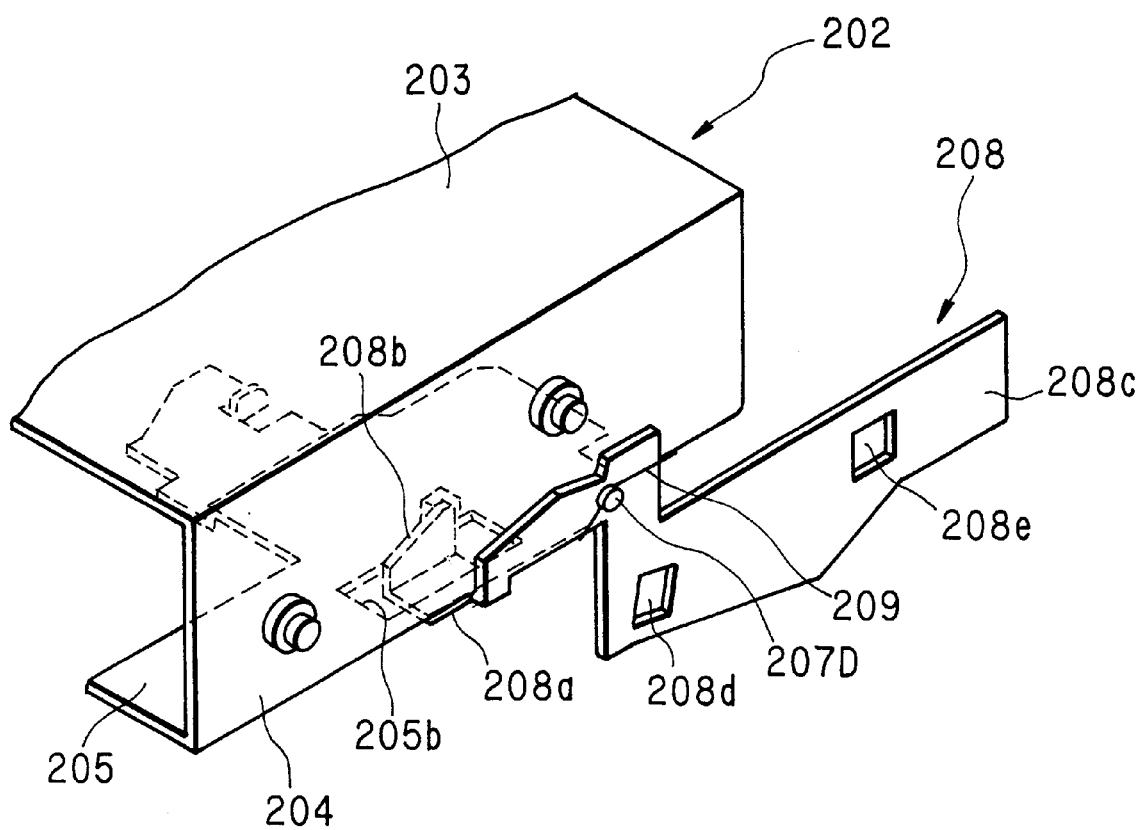
FIG. 21 is enlarged perspective view showing essential parts of the 2nd embodiment.

Further, mech-chassis 212 has a light emitter 230. Provided on the inner side of frame 213A positioned on the right side in FIG. 16 are a light-receiving sensor 231 that receives the sensor light from light emitter 230.

The sensing device consisting of light emitter 230 and light-receiving sensor 231 detects the timing of starting the cassette in-pulling operation (to be described next), and in addition, performs BOT detection (detection of the beginning of taking up the magnetic tape accommodated in cassette LC or SC) and EOT detection (detection of the end of taking up the magnetic tape accommodated in cassette LC or SC). Due to the tape winding direction of the cassette, the sensing device provided on the right of the frame in the figure is adapted to detect BOT, whereas the sensing device on the left of the frame is adapted to detects EOT.

Figure 22A:
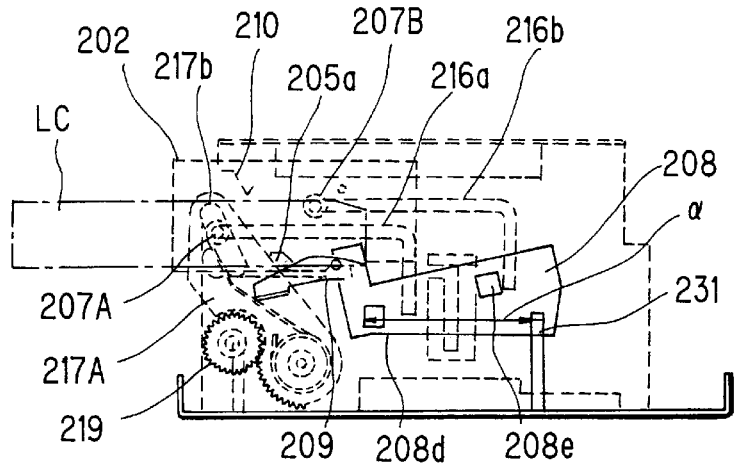
FIGS. 22A–22D are views showing the steps of the loading operation of an L-cassette in the 2nd embodiment.

Referring next to FIGS. 22A–22D, the loading operation of an L-cassette LC will be described. First, as shown in FIG. 22A, an L-cassette LC is inserted from an unillustrated inserting port so that it is placed on L-cassette guiding piece 205 of cassette holder 202. A further insertion of the L-cassette LC into the chassis interior makes it abut stopper piece 205a, on its inner side edge with respect to the moving direction of LC-cassette LC. In this condition, the L-cassette LC is pressed against L-cassette guiding piece 205 from above by leaf springs 210, so that it will be stably held inside cassette holder 202. Further, when the L-cassette LC is inserted into cassette holder 202, the bottom face of the L-cassette LC becomes engaged with distal end 208b of timing change lever 208 so as to slightly move timing change lever 208 in the counterclockwise direction in FIGS. 22A and 22D. Therefore, 2nd opening 208e moves to a position slightly higher than the height of the sensor optical path between light emitter 230 and light-receiving sensor 231. Whereas, 1st opening 208d is positioned as high as the sensor optical path between light emitter 230 and light-receiving sensor 231.

When the L-cassette LC is further pushed in, the L-cassette LC presses stopper piece 205a so that cassette holder 202 slightly moves toward the chassis interior. At this moment, 1st and 2nd slider axles 207A and 207B rocks whilst being guided along respective 1st and 2nd guide slots 216a and 216b. The distal ends of drive arms 217A and 217B whose slots 217b are engaged with 1st and 2nd slider axles 207A and 207B, sway toward the chassis interior (in the clockwise direction in FIGS. 22A–22D). As a result, double-acting plate 221 in mesh with semicircular gear 217c formed in left drive arm 217B slightly moves toward the chassis interior.

Figure 22B:
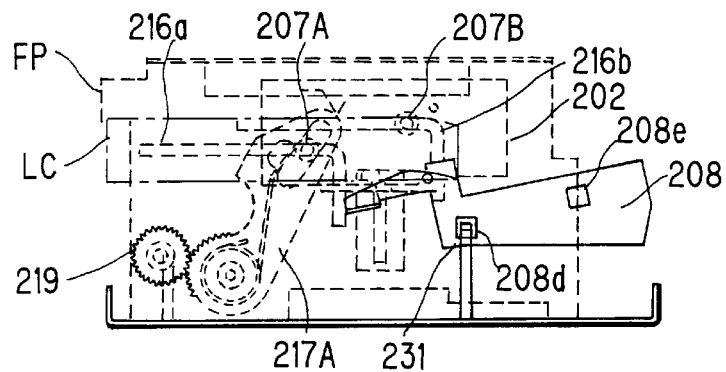

As shown in FIG. 22B, when double-acting plate 221 has moved toward the chassis interior and with this movement, timing change lever 208 has moved toward the chassis interior by a spacing distance α (see FIG. 22A) between light-receiving sensor 231 and 1st opening 208d, 1st opening 208d located on the front side with respect to the cassette's direction of movement becomes positioned in the sensor optical path between light emitter 230 and light-receiving sensor 231.

As a result, light-receiving sensor 231 receives the sensor light from light emitter 230. In response to the signal of light sensing detection, an unillustrated driving motor is activated, and the driving force is transmitted to rack 222f. Accordingly, driving plate 222 moves toward the chassis interior. When it has moved to a position where abutment piece 222d abuts double-acting plate 221, double-acting plate 221 together with driving plate 222 begins to move toward the chassis interior.

Here, the amount of stroke of cassette holder 202 until 1st opening 208d reaches the sensor optical path between light emitter 230 and light-receiving sensor 231 will be equal to the aforementioned spacing distance α. Since 1st opening 208d is more distant from light-receiving sensor 231 than 2nd opening 208e, the amount of stroke of cassette holder 202 in this case is greater than that in the case where 2nd opening is used. As a result, the L-cassette LC held in cassette holder 202 moves deeper toward the chassis interior. When the rear side face of the cassette with respect to the cassette's direction of movement becomes substantially flush with the VTR front panel FP (at the same position as the front ends of frames 213A and 213B), light-receiving sensor 231 will detect the sensor light. Accordingly, the cassette in-pulling operation will start from a position where the L-cassette LC is only marginally projected out from the VTR front panel FP.

When double-acting plate 221 has been forcibly shifted toward the chassis interior by driving plate 222, the arm end of drive arm 217B meshed with rack gear 221d swayingly moves toward the chassis interior (in the clockwise direction in FIGS. 22A–22D) while driving arm 217A also swayingly moves in the same direction through timing gear 219, link shaft 218 and timing gear 219. Then, 1st slider axles 207A engaging slots 217b of drive arms 217A and 217B move toward the chassis interior, and this causes cassette holder 202 to move together with the L-cassette LC toward the chassis interior.

Figure 22C:
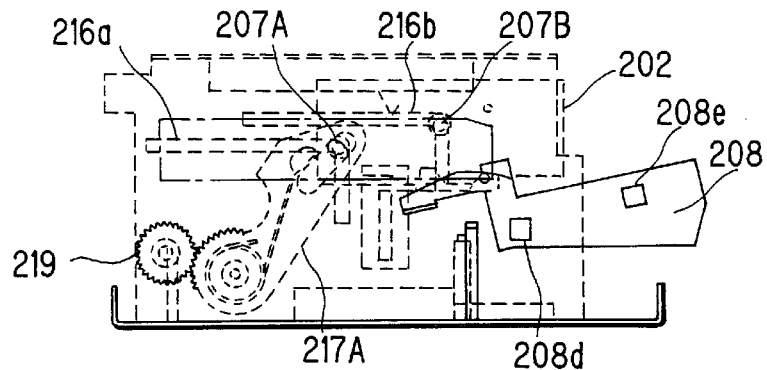

In this way, as cassette holder 202 continues to move toward the chassis interior, 1st and 2nd slider axles 207A and 207B, as shown in FIG. 22C, will reach the vertically slotted portions of 1st and 2nd guide slots 216a and 216b, and 3rd slider axle 207C will become engaged with rib-formed guide slot 216c.

Before 1st and 2nd slider axles 207A and 207B reach the vertically slotted portions of 1st and 2nd guide slots 216a and 216b, an unillustrated cassette size detecting lever provided on mech-chassis 212 detects the inserted cassette as to be an L-cassette LC, to thereby drive an unillustrated reel table shifting mechanism. In this way, unillustrated reel tables are adjusted so that the distance between the reel tables will match the reel distance of L-cassette LC.

When driving plate 222 is further driven toward the chassis interior by an unillustrated motor, drive arms 217A and 217B sways more. Then, 1st and 2nd slider axles 207A and 207B move downwards along the vertically slotted portions of 1st and 2nd guide slots 216a and 216b, and 3rd slider axles 207C go down along rib-formed guide slots 216c. Consequently, cassette holder 202 moves downwards together with the L-cassette LC.

Figure 22D:
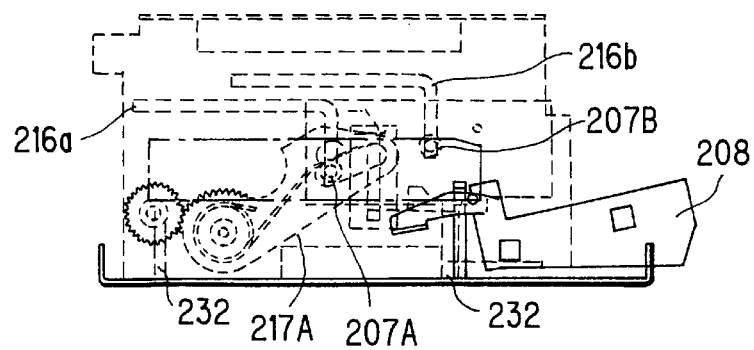

As shown in FIG. 22D, when cassette holder 202 has moved down to its terminal position, the L-cassette LC is placed on four cassette stays 232 planted on mech-chassis 212. In this condition, cassette holder 202 is pressed downwards by means of cassette pressing springs 217d provided for drive arms 217A and 217B. Therefore, the L-cassette LC becomes pressed in contact with cassette stays 232 with its bottom slightly spaced away from L-cassette guiding piece 205.

Thus, the loading operation of L-cassette LC is completed. The ejecting operation of L-cassette LC is effected in the reverse order of the aforementioned loading operation.

Figure 23A:
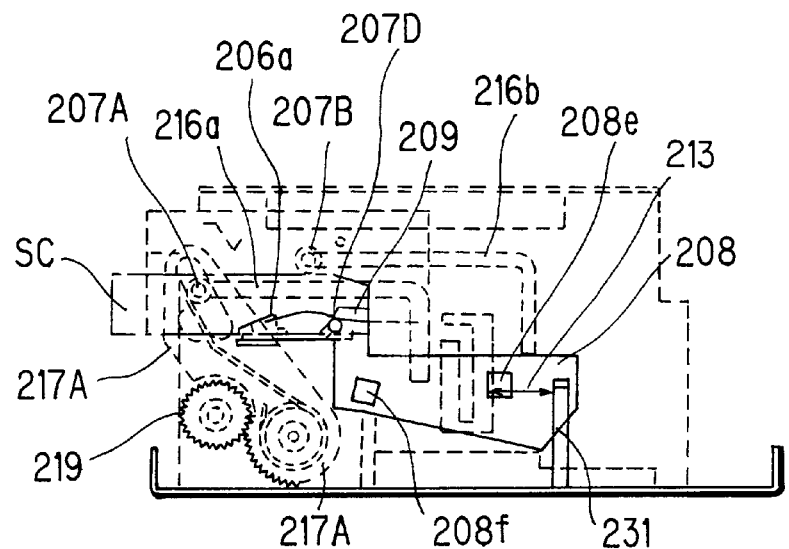
FIGS. 23A and 23B are views showing the steps of the loading operation of an S-cassette in the 2nd embodiment.
Figure 23B:
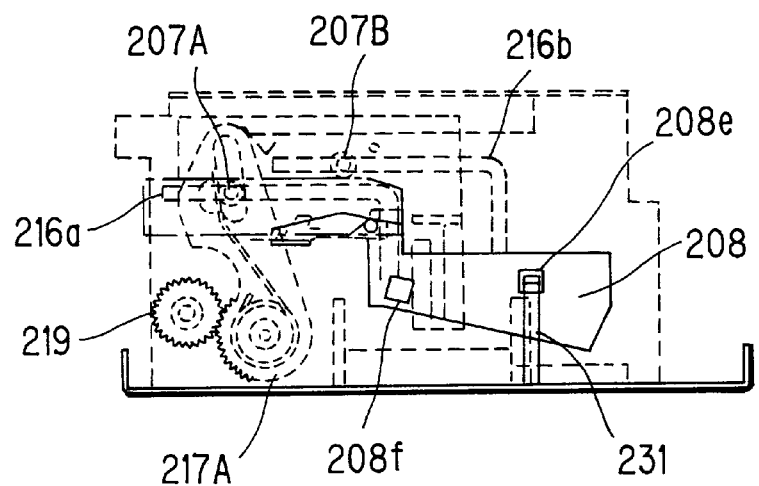

Referring next to FIGS. 23A and 23B, the loading operation of an S-cassette SC will be described. First, as shown in FIG. 23A, an S-cassette SC is inserted from an unillustrated inserting port so that it is placed on S-cassette guiding piece 206 of cassette holder 202. A further insertion of the S-cassette SC into the chassis interior makes it abut stopper piece 206a, on its inner side edge with respect to the moving direction of SC-cassette SC. In this condition, the S-cassette SC is pressed against S-cassette guiding piece 206 from above by leaf springs 211, so that it will be stably held inside cassette holder 202. Since, the S-cassette SC is inserted onto S-cassette guiding piece of cassette holder 202, the bottom face of the S-cassette SC will not be engaged with distal end 208b of timing change lever 208 so that timing change lever 208 will be urged by spring 209 and therefore be kept at a position where it abuts the bottom face of S-cassette guiding piece 206. Therefore, 1st opening 208d is positioned lower to some extent than the position of the sensor optical path between light emitter 230 and light-receiving sensor 231. Whereas, 2nd opening 208e becomes positioned as high as the sensor optical path between light emitter 230 and light-receiving sensor 231.

When the S-cassette SC is further pushed in, the S-cassette SC presses stopper piece 206a so that cassette holder 202 slightly moves toward the chassis interior. At this moment, 1st and 2nd slider axles 207A and 207B move whilst being guided along respective 1st and 2nd guide slots 216a and 216b. The distal ends of drive arms 217A and 217B whose slots 217b are engaged with 1st and 2nd slider axles 207A and 207B, swayingly move toward the chassis interior (in the clockwise direction in FIGS. 23A and 23B). As a result, double-acting plate 221 in mesh with semicircular gear 217c formed in left drive arm 217B slightly moves toward the chassis interior.

As shown in FIG. 23B, when double-acting plate 221 has moved toward the chassis interior and with this movement, timing change lever 208 has moved toward the chassis interior by a spacing distance β (see FIG. 23A) between light-receiving sensor 231 and 2nd opening 208e, 2nd opening 208e located on the inner side with respect to the cassette's direction of movement becomes positioned in the sensor optical path between light emitter 230 and light-receiving sensor 231.

As a result, light-receiving sensor 231 receives the sensor light from light emitter 230. In response to the signal of light sensing detection, an unillustrated driving motor is activated, and the driving force is transmitted to rack 222f. Accordingly, driving plate 222 moves toward the chassis interior. When it has moved to a position where abutment piece 222d abuts double-acting plate 221, double-acting plate 221 together with driving plate 222 begins to move toward the chassis interior.

Here, the amount of stroke of cassette holder 202 until 2nd opening 208e reaches the sensor optical path between light emitter 230 and light-receiving sensor 231 will be equal to the aforementioned spacing distance β. Since 2nd opening 208e is closer to light-receiving sensor 231 than 1st opening 208d, the amount of stroke of cassette holder 202 in this case is smaller. As a result, the S-cassette SC held in cassette holder 202 does not move deeper toward the chassis interior. When the rear side face, with respect to the cassette's direction of movement, of the S-cassette SC becomes substantially flush with the VTR front panel FP (at the same position as the front ends of frames 213A and 213B), light-receiving sensor 231 will detect the sensor light. Accordingly, the cassette in-pulling operation will start from a position where the S-cassette SC is only marginally projected out from the VTR front panel FP.

The subsequent procedures of the loading operation as well as the ejecting operation of S-cassette SC are the same as those of L-cassette LC, therefore the description is omitted.

The 3rd embodiment

Figure 24A:
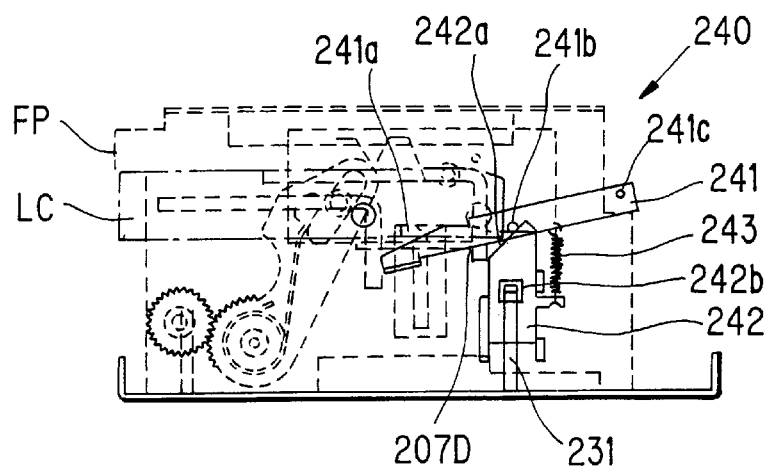
FIGS. 24A and 24B are views each showing a single step of the loading operation of an L-cassette and an S-cassette, respectively in the 3rd embodiment.
Figure 24B:
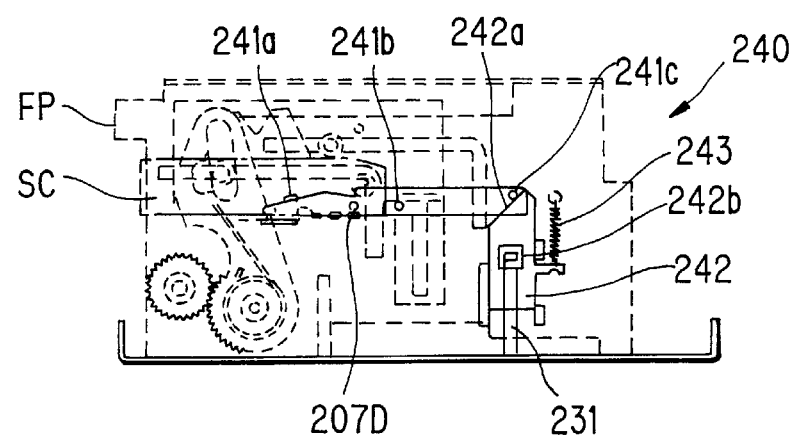

A cassette loading device 240 will be illustrated with reference to FIGS. 24A and 24B, but this basically has a similar configuration to that in the 2nd embodiment. Therefore, identical or like components are allotted with the same reference numerals and the detailed description of those will be omitted.

This cassette loading device 240 has a timing change lever 241 and a shutter 242. Timing change lever 241 basically has a similar configuration to timing changer lever 208 in the 2nd embodiment. Specifically, timing change lever 208 is pivotally attached to boss 207D provided in cassette holder 202, and its distal end 241a is fitted through opening 205b of L-cassette guiding piece 205 so as to be projected into the interior of cassette holder 202. Timing change lever 241 is characterized by having 1st and 2nd engaging projections 241b and 241c, in place of 1st and 2nd openings 208d and 208e in timing changer lever 208. First engaging projection 241b is provided near boss 207D, whereas 2nd engaging projection 241c is provided away from boss 207D.

Shutter 242 is provided along the inner surface of right frame 213A. Shutter 242 is provided along frame 213A so as to be movable upward and downward and is urged upward by a spring 243. Shutter 242 has a slanting surface 242a at the upper part thereof which is engaged with 1st and 2nd engaging projections 241b and 241c of timing change lever 241. Shutter 242 also has an opening 242b which allows completion of the optical path from light emitter 230 to light-receiving sensor 231.

Next, the loading operation of an L-cassette LC in this cassette loading device 240 will be described. First, as shown in FIG. 24A, an L-cassette LC is inserted from an unillustrated inserting port so that it is placed on L-cassette guiding piece 205 of cassette holder 202. A further insertion of the L-cassette LC into the chassis interior makes it abut stopper piece 205a, on its inner side edge with respect to the moving direction of L-cassette LC. In this condition, when the L-cassette LC is inserted into cassette holder 202, the bottom face of the L-cassette LC becomes engaged with distal end 241a of timing change lever 241 so as to slightly move timing change lever 241 in the counterclockwise direction in FIGS. 24A and 24B. Therefore, 2nd engaging projection 241c moves to a position slightly higher than that of engagement with slanting surface 242a of shutter 242. Whereas, 1st engaging projection 241b is positioned as high as the position of engagement with slanting surface 242a of shutter 242.

In this condition, when cassette holder 202 is further pushed in by the L-cassette LC, 1st engaging projection 241b which is spaced away from slanting surface 242a becomes engaged with slanting surface 242a of shutter 242 so as to forcibly move shutter 242 downward opposing the force of spring 243. As a result, opening 242b of shutter 242 moves into the optical path between light emitter 230 and light-receiving sensor 231 so that light-receiving sensor 231 receives the sensor light from light emitter 230. In response to the signal of light sensing detection, an unillustrated driving motor is activated, and a similar cassette in-pulling operation to that in the foregoing first embodiment will start.

Here, the amount of stroke of cassette holder 202 until opening 242b reaches the sensor optical path between light emitter 230 and light-receiving sensor 231 will be equal to the spacing distance between 1st engaging projection 241b and slanting surface 242a when no L-cassette LC is held. Since 1st engaging projection 241b is more distant from slanting surface 242a than 2nd engaging projection 241c, the amount of stroke of cassette holder 202 when an L-cassette LC is held, is greater than the amount of stroke when an S-cassette SC is held. Therefore, the L-cassette LC held in cassette holder 202 moves deeper toward the chassis interior. When the rear side face of the cassette with respect to the cassette's direction of movement becomes substantially flush with the VTR front panel FP (at the same position as the front ends of frames 213A and 213B), light-receiving sensor 231 will detect the sensor light. Accordingly, the cassette in-pulling operation will start from a position where the L-cassette LC is only marginally projected out from the VTR front panel FP.

Next, the loading operation of an S-cassette SC will be described with reference to FIG. 24B. First, an S-cassette SC is inserted from an unillustrated inserting port so that it is placed on S-cassette guiding piece 206 of cassette holder 202. A further insertion of the S-cassette SC into the chassis interior makes it abut stopper piece 206a, on its inner side edge with respect to the moving direction of SC-cassette SC. In this condition, since the S-cassette SC is inserted onto S-cassette guiding piece 206 of cassette holder 202, the bottom face of the S-cassette SC will not be engaged with distal end 241a of timing change lever 241 so that timing change lever 241 will be urged by spring 209 (not shown in FIGS. 24A and 24B) and therefore be kept at a position where it abuts the bottom face of S-cassette guiding piece 206. Therefore, 1st and 2nd engaging projections 241b and 241c are positioned at a level so as to engage slanting surface 242a.

In this condition, when cassette holder 202 is further pushed in by the S-cassette SC, 2nd engaging projection 241c which is close to slanting surface 242a becomes engaged with slanting surface 242a of shutter 242 so as to forcibly move shutter 242 downward opposing the force of spring 243. As a result, opening 242b of shutter 242 moves into the optical path between light emitter 230 and light-receiving sensor 231 so that light-receiving sensor 231 receives the sensor light from light emitter 230. In response to the signal of light sensing detection, an unillustrated driving motor is activated, and a similar cassette in-pulling operation to that in the foregoing first embodiment will start.

Here, the amount of stroke of cassette holder 202 until opening 242b reaches the sensor optical path between light emitter 230 and light-receiving sensor 231 will be equal to the spacing distance between 2nd engaging projection 241c and slanting surface 242a when no S-cassette SC is held. Since 2nd engaging projection 241c is closer to slanting surface 242a than 1st engaging projection 241b, the amount of stroke of cassette holder 202 when an S-cassette SC is held is smaller than the amount of stroke when an L-cassette LC is held. Therefore, the S-cassette SC held in cassette holder 202 does not move deeper toward the chassis interior. When the rear side face, with respect to the cassette's direction of movement, of the S-cassette SC becomes substantially flush with the VTR front panel FP (at the same position as the front ends of frames 213A and 213B, or in FIG. 24B, at a position which is slightly depressed toward the chassis interior from the VTR front panel FP), light-receiving sensor 231 will detect the sensor light. Accordingly, the cassette in-pulling operation will start from that position.

The 4th embodiment

Figure 25A:
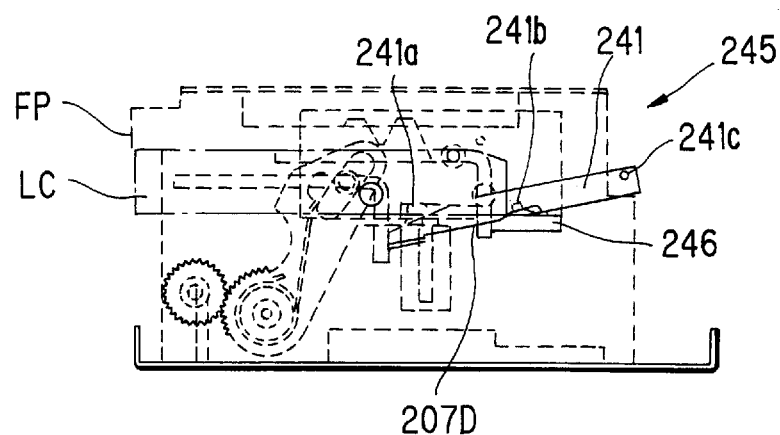
FIGS. 25A and 25B are views each showing a single step of the loading operation of an L-cassette and an S-cassette, respectively in the 4th embodiment.
Figure 25B:
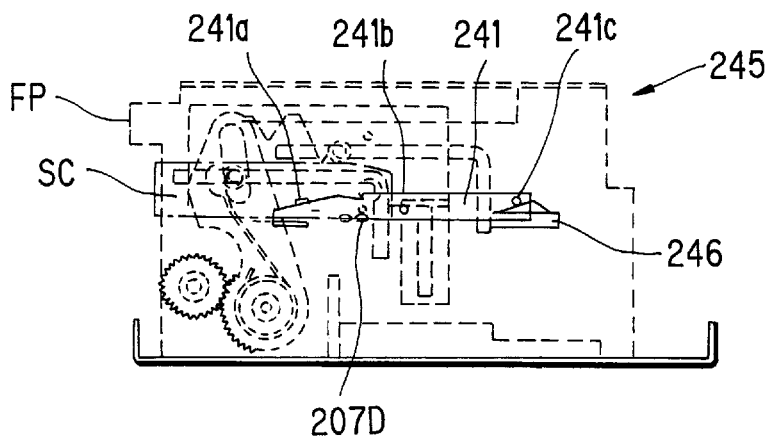

A cassette loading device 245 will be illustrated with reference to FIGS. 25A and 25B. This cassette loading device 245 is a variation of the third embodiment, therefore, identical or like components are allotted with the same reference numerals and the detailed description of those will be omitted.

In place of light emitter 230, light-receiving sensor 231 and shutter 242 in the above cassette loading device 240, cassette loading device 245 is characterized by having a cassette loading switch 246 comprised of a leaf switch. Cassette loading switch 246 is provided on the inner side of right frame 213A in such a position that it will become engaged with 1st and 2nd engaging projection 241b and 241c.

Next, the loading operation of an L-cassette LC in this cassette loading device 245 will be described. As shown in FIG. 25A, an L-cassette LC is inserted from an unillustrated inserting port so that it is placed on L-cassette guiding piece 205 of cassette holder 202. A further insertion of the L-cassette LC into the chassis interior makes it abut stopper piece 205a, on its inner side edge with respect to the moving direction of LC-cassette LC. In this condition, when the L-cassette LC is inserted into cassette holder 202, the bottom face of the L-cassette LC becomes engaged with distal end 241a of timing change lever 241 so as to slightly move timing change lever 241 in the counterclockwise direction in FIGS. 25A and 25B. Therefore, 2nd engaging projection 241c moves to a position slightly higher than the position of engagement with cassette loading switch 246. Whereas, 1st engaging projection 241b is positioned as high as the position of engagement with cassette loading switch 246.

In this condition, when cassette holder 202 is further pushed in by the L-cassette LC, 1st engaging projection 241b becomes engaged with cassette loading switch 246 to set cassette loading switch 246 into the ON state. This activates an unillustrated driving motor so that a similar cassette in-pulling operation to that in the foregoing 2nd embodiment will start.

Here, since 1st engaging projection 241b is more distant from cassette loading switch 246 than 2nd engaging projection 241c, the amount of stroke of cassette holder 202 when an L-cassette LC is held, is greater than the amount of stroke when an S-cassette SC is held. Therefore, the L-cassette LC held in cassette holder 202 moves deeper toward the chassis interior. When the rear side face of the cassette with respect to the cassette's direction of movement becomes substantially flush with the VTR front panel FP (at the same position as the front ends of frames 213A and 213B), cassette loading switch 246 is set into the ON state. Accordingly, the cassette in-pulling operation will start from a position where the L-cassette LC is only marginally projected out from the VTR front panel FP.

Next, the loading operation of an S-cassette SC will be described with reference to FIG. 25B. First, an S-cassette SC is inserted from an unillustrated inserting port so that it is placed on S-cassette guiding piece 206 of cassette holder 202. A further insertion of the S-cassette SC into the chassis interior makes it abut stopper piece 206a, on its inner side edge with respect to the moving direction of S-cassette SC. In this condition, since the S-cassette SC is inserted onto S-cassette guiding piece 206 of cassette holder 202, the bottom face of the S-cassette SC will not be engaged with distal end 241a of timing change lever 241 so that timing change lever 241 will be urged by spring 209 (not shown in FIGS. 25A and 25B) and therefore be kept at a position where it abuts the bottom face of S-cassette guiding piece 206. Therefore, 1st and 2nd engaging projections 241b and 241c are positioned at a level so as to engage cassette loading switch 246.

In this condition, when cassette holder 202 is further pushed in by the S-cassette SC, 2nd engaging projection 241c which is close to cassette loading switch 246 becomes engaged with cassette loading switch 246 so as to set cassette loading switch 246 into the ON state. This activates an unillustrated driving motor so that a similar cassette in-pulling operation to that in the foregoing the 2nd embodiment will start.

Here, since 2nd engaging projection 241c is closer to cassette loading switch 246 than 1st engaging projection 241b, the amount of stroke of cassette holder 202 when an S-cassette SC is held is smaller than the amount of stroke when an L-cassette LC is held. Therefore, the S-cassette SC held in cassette holder 202 does not move deeper toward the chassis interior. When the rear side face, with respect to the cassette's direction of movement, of the S-cassette SC becomes substantially flush with the VTR front panel FP (at the same position as the front ends of frames 213A and 213B, or in FIG. 25B, at a position which is slightly depressed toward the chassis interior from the VTR front panel FP), cassette loading switch 246 will be set into the ON state, so that the cassette in-pulling operation will start from that position.

The 5th embodiment

Figure 27:
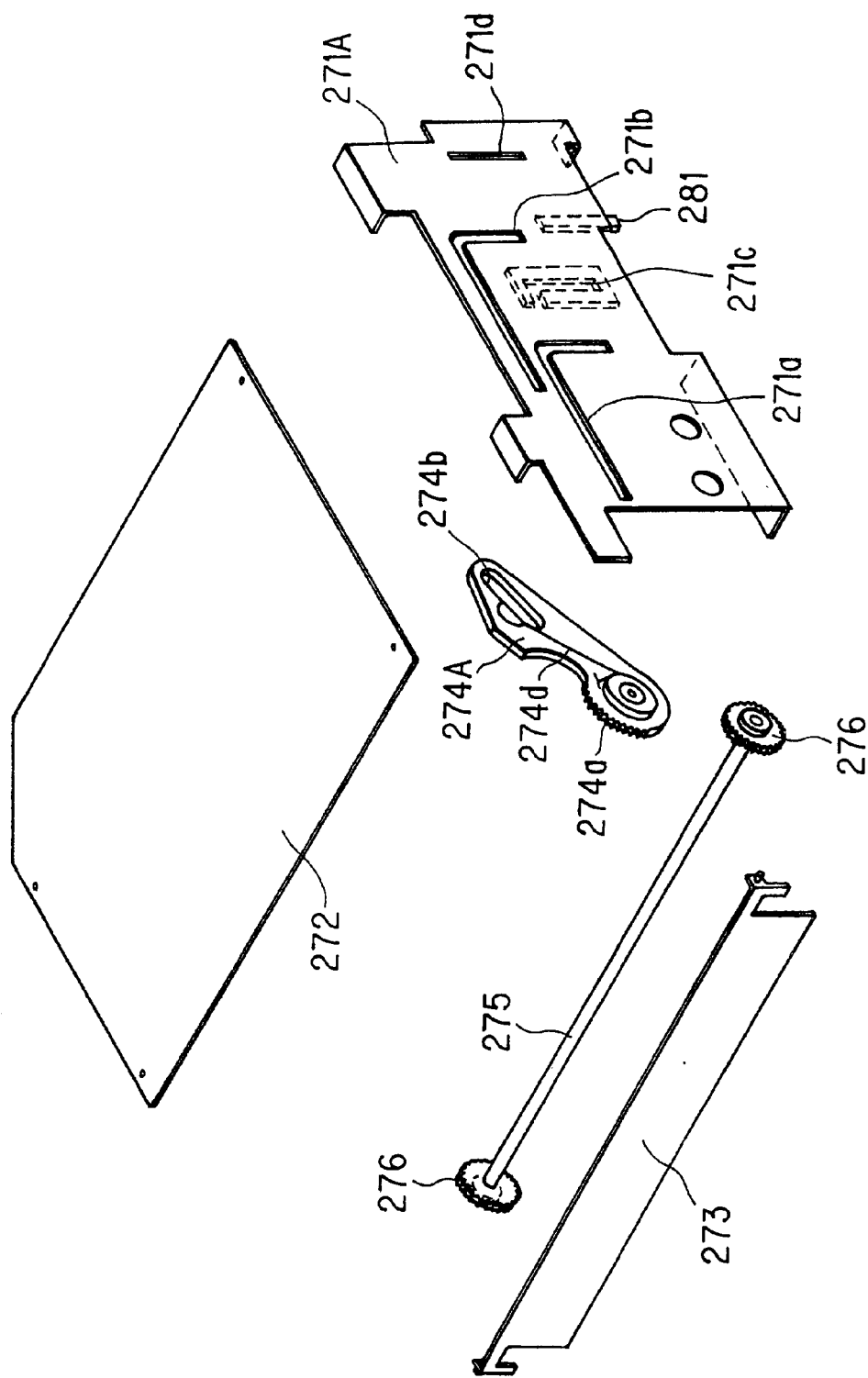
FIG. 27 is an exploded perspective view showing essential parts of the 5th embodiment.
Figure 28:
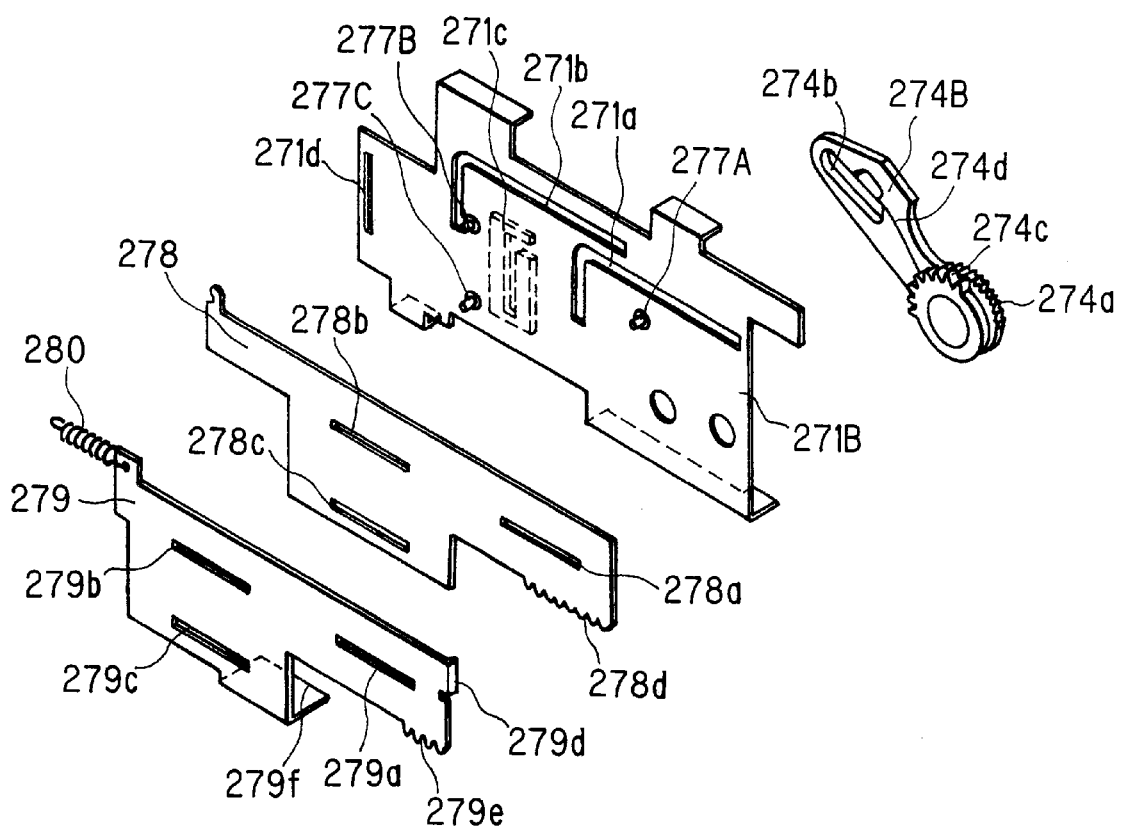
FIG. 28 is an exploded perspective view showing essential parts of the 5th embodiment.

A cassette loading device 250 comprises an L-cassette holder 251 and an S-cassette holder 252 as shown in FIGS. 26–28. S-cassette holder 252 is made to fit on L-cassette holder 251 in a slidable manner along the cassette's direction of movement.

L-cassette holder 251 is integrally formed of a top portion 253, left and right side portions 254, and L-cassette guiding pieces 255 for guiding the undersurface of L-cassette LC. L-cassette guiding piece 255 has a stopper piece 255a which has been formed upright to bear the front part of L-cassette LC. The L-cassette guiding piece 255 on the right in FIG. 26 has an opening 255b into which an aftermentioned timing change lever 262 is fitted. Leaf springs 256 for pressing L-cassette are press fitted in top portion 253. The distance between left and right L-cassette guiding pieces 255 is set equal to or greater than the width of S-cassette SC.

Provided for side portions 254 are bosses 257 projecting outwards. L-holder side plates 258 are fixed to bosses 257 with screws. A coupling gear 259 and a fixed rack guiding boss 260 are provided on the inner side of L-holder side plate 258. Coupling gear 259 is composed of two different-sized gears having different pitch circle diameters, a large-diametric gear part 259a and a small-diametric gear part 259b integrally formed concentrically, and is attached rotatably to L-holder side plate 258. Provided on the outer side of L-holder side plate 258 are 1st to 3rd slider axles 261A, 261B and 261C and a boss 261D. A guide slot 258a extending horizontally is formed in L-holder side plate 258.

Boss 261D is provided only on one of L-holder side plates 258, located on the right side in FIG. 26, and timing change lever 262 is attached swayably thereto. Timing change lever 262 basically has a similar configuration as in the timing change lever 208 shown in FIG. 21 though it is attached at a different position. Illustratively, timing change lever 262 is pivotally supported at the central portion across its width by boss 261D. An end portion, designated at 262a, on the near side, with respect to the cassette's direction of insertion, of timing change lever 262 is bent so as to fit along the bottom surface of L-cassette guiding piece 255. Further, a distal end 262b of end portion 262a is bent upward so that it can be fitted through opening 255b of L-cassette guiding piece 255. Since opening 255b is provided in L-cassette guiding piece 255, distal end 262b will engage the bottom of the L-cassette LC only when an L-cassette LC is loaded to cassette holder 251, whereas it will not engage the bottom of the S-cassette SC when an S-cassette SC is loaded.

Another end portion 262c of timing change lever 262 on the inner side with respect to the cassette's direction of insertion is formed in an L-shape and is positioned below side portion 254. This end portion 262c has a 1st opening 262d and a 2nd opening 262e. First and second openings 262d and 262e are arranged along the length of end portion 262c. Timing change lever 262 thus configured is urged by a spring 263 in such a direction that its distal end 262b projects from opening 255b (in clockwise direction in FIG. 26).

A fixed rack 264 is provided between side portion 254 and L-holder side plate 258. Fixed rack 264 has a first rack gear 264a meshing large-diametric gear part 259a, a guide slot 264b engaged with fixed rack guide boss 260 and a position regulating boss 264c.

S-cassette holder 252 is composed of a top portion 265, left and right side portions 266 and S-cassette guiding pieces 267 for guiding the undersurface of S-cassette SC. S-cassette guiding piece 267 has a stopper piece 267a which has been formed upright to bear the front part of S-cassette SC. Leaf springs 268 for pressing S-cassette are press fitted in top portion 265.

Fixed on the outer face of side portion 266 is a movable rack 269, which has a 2nd rack gear 269a and a sliding bosses 269b. Second rack gear 269a is meshed with small-diametric gear part 259b of coupling gear 259. Sliding bosses 269b engage with guide slot 258a of L-holder side plate 258.

Provided for top portion 253 of L-cassette holder 251 are clearance holes 253a for leaf springs 268 on S-cassette holder 252.

Mech-chassis 270 which supports cassette loading device 250, has a pair of right and left frames 271A and 271B standing upright parallel to each other. A top plate 272 is provided between frames 271A and 271B. Pivotally supported between frames 271A and 271B is a cassette port door 273 for opening and closing the port for both cassette holders 251 and 252. Frames 271A and 271B each have a 1st L-shaped guide slot 271a engaged with and guiding the 1st slider axle 261A of L-cassette side plate 258, and a 2nd L-shaped guide slot 271b engaged with and guiding 2nd slider axle 261B, whereby L-cassette side plate 258 is supported so as to be able to slide along guide slots 271a and 271b. Further, frames 271A and 271B each include: a rib-formed guide slot 271c which is engaged with 3rd slider axle 261C to guide the downward movement when both cassette holders 251 and 252 move downwards; and a guide slot 271d which guides position regulating boss 264c of fixed rack 264 in the vertical direction and inhibits the motion in the cassette's direction of movement.

Drive arms 274A and 274B are pivoted on the inner sides of respective frames 271A and 271B so that they are free to rock back and forth. Drive arms 274A and 274B each have a semicircular gear 274a formed coaxially with the support axle thereof. Rotationally supported between left and right frames 271A and 271B is a link shaft 275. This link shaft 275 has timing gears 276, 276 attached at both ends in phase. Timing gears 276, 276 are in mesh with semicircular gears 274a of drive arms 274A and 274B, respectively, so that both drive arms 274A and 274B will rotate integrally.

Drive arms 274A and 274B have respective slots 274b, 274b, which extend along the length thereof. This slot 274b is engaged with 1st slider axle 261A which also fits through 1st guide slot 271a. Left drive arm 274B has another semicircular gear 274c which is formed coaxially with the support axle of drive arm 274B. Drive arms 274A and 274B each have a cassette pressing spring 274d which urges 1st slider axle 261A engaging slot 274b, in such a direction as to press the distal end of drive arm 274A or 274B toward the chassis interior (in the clockwise direction in FIG. 27, and in the counterclockwise direction in FIG. 28).

Provided on the inner side of right frame 271A is a light-receiving sensor 281 for receiving the sensor light from a light emitter provided for mech-chassis 270 (this light emitter is not shown in the figure but is provided in the same position as light emitter 230 in the 2nd embodiment).

The outer side of left frame 271B has 4th through 6th slider axles 277A, 277B and 277C press fitted thereon. A double-acting plate 278 is provided on the outer side of left frame 271B. Double-acting plate 278 has guide slots 278a, 278b and 278c which are engaged with 4th through 6th slider axles 277A to 277C, respectively, so that double-acting plate 278 will be able to move back and forth relative to frame 271B in the cassette's direction of insertion. Double-acting plate 278 has a rack gear 278d meshed with semicircular gear 274c of drive arm 274B so that double-acting plate 278 will move linearly in the cassette's direction of insertion as drive arm 274B moves swayingly.

Provided on the outer side of double-acting plate 278 is a driving plate 279, which has guide slots 279a, 279b and 279c engaged with 4th through 6th slider axles 277A to 277C, respectively. By this arrangement, driving plate 279 will be able to move back and fourth relative to frame 271B in the cassette's direction of insertion.

A double-acting spring 280, a tension spring is provided between double-acting plate 278 and driving plate 279 at their inner ends thereof. Formed on the near end, with respect to the cassette's direction of movement, of driving plate 279 is an abutment piece 279d which is bent toward double-acting plate 278 so that it will abut double-acting plate 278. Driving plate 279 has a rack gear 279e which, similarly to rack gear 278d, is in mesh with semicircular gear 274c, and another rack gear 279f which receives the driving force from an unillustrated driver motor for loading.

Rack gear 278d is formed with such a length as to be in mesh with semicircular gear 274c from the beginning of the rocking movement of drive arm 274B to the end. Rack gear 279e is formed with such a length that it will not be in mesh at the beginning of the rocking movement of drive arm 274B but will become engaged with semicircular gear 274c of drive arm 274B in the course of rocking movement of the arm to the end.

In cassette loading device 250 thus configured, since fixed rack 264 is inhibited from moving in the cassette's direction of movement by guide slot 271d, when L-cassette holder 251 is moved, S-cassette holder 252 will also move through coupling gear 259 and fixed rack 264. In this case, S-cassette holder 252 undergoes extra movement compared to L-cassette holder 251, corresponding to the ratio of the pitch circle diameters of large-diametric gear part 259a and small-diametric gear part 259b. If, for example, large- and small-diametric gear parts 259a and 259b have the same pitch circle diameter, or the ratio of the pitch circle diameters is set at 1:1, the moving ratio of L-cassette holder 251 and S-cassette holder 252 becomes equal to 1:2. If the ratio of the pitch circle diameters is set at 1:2, the moving ratio becomes equal to 2:3. In this way, the ratio of the pitch circle diameters can be changed so as to optimize the travel distance of S-cassette holder 252 relative to L-cassette holder 251.

Here, in order for the positioning holes provided in L- and S-cassettes LC and SC to reach identical alignment, it should be noted that the inner end position of L-cassette holder 251 on the chassis interior side and that of S-cassette holder 252 must be made coincident at the terminal position of horizontal conveyance. In a horizontal conveyance mechanism for cassette holder using coupling gear 259 as stated above, when the mechanism is constructed so that, at the terminal position of horizontal conveyance, the inner end position of L-cassette holder 251 on the chassis interior side is made coincident with that of S-cassette holder 252, the ends of the cassette holders on the chassis interior side will be located at different points when they are at the starting positions in the horizontal conveyance, since the cassette holders 251 and 252 differ with each other in their amounts of movement. Specifically, the end on the chassis interior side of L-cassette holder 251 will be located at a more inward position relative to the chassis interior than that of S-cassette holder 252 (see FIGS. 29A and 30A).

The horizontal conveyance starts from the inserted positions of L- and S-cassettes LC and SC (at the positions where cassettes LC and SC abut stopper pieces 255a and 267a, respectively). Since the L-cassette holder 251 is located at a more inward position relative to the chassis interior, it is possible to reduce the projected amount (designated at LD in FIG. 29A) of L-cassette LC at its inserted position from the VTR front panel FP. Further, by adjusting the ratio of the pitch circle diameters of large-diametric gear part 259a and small-diametric gear part 259b, the projected amount (designated at SD in FIG. 29A) of S-cassette SC at its inserted position from the VTR front panel FP can be made coincident with the aforementioned projected amount LD.

Figure 29A:
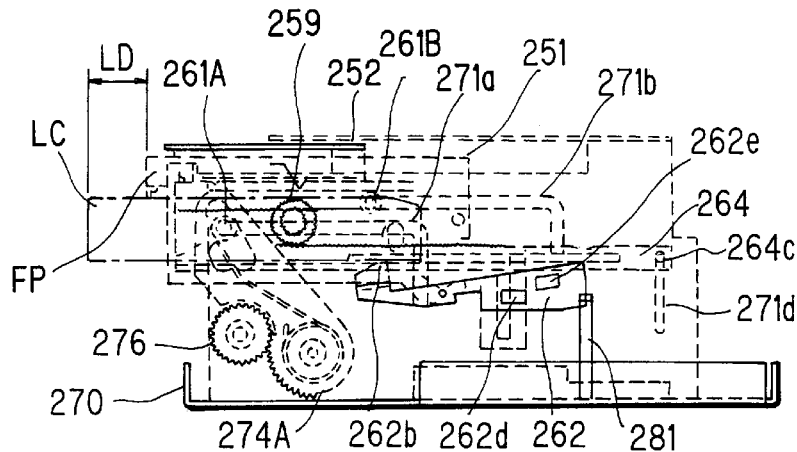
FIGS. 29A–29D are views showing the steps of the loading operation of an L-cassette in the 5th embodiment.

Referring next to FIGS. 29A–29D, the loading operation of an L-cassette LC will be described. First, as shown in FIG. 29A, an L-cassette LC is inserted from an unillustrated inserting port so that it is placed on L-cassette guiding piece 255 of cassette holder 251. A further insertion of the L-cassette LC into the chassis interior makes it abut stopper piece 255a, on its inner side edge. In this condition, the L-cassette LC is pressed against L-cassette guiding piece 255 from above by leaf springs 256, so that it will be stably held inside L-cassette holder 251. When the L-cassette LC is further pushed into cassette holder 251, the bottom face of the L-cassette LC becomes engaged with distal end 262b of timing change lever 262 so as to slightly move timing change lever 262 in the clockwise direction in FIGS. 29A–29D. Therefore, 2nd opening 262e moves to a position slightly higher than the height of the sensor optical path for light-receiving sensor 281. Whereas, 1st opening 262d is positioned as high as the sensor optical path for light-receiving sensor 231.

When the L-cassette LC is further pushed in, the L-cassette LC engages and presses stopper piece 255a so that L-cassette holder 251 slightly moves toward the chassis interior. At that moment, coupling gear 259 moves together with L-cassette holder 251. As L-cassette holder 251 moves, coupling gear 259 moves with large-diametric gear part 259a rolling in mesh with 1st rack gear 264a.

Movable rack 269 (S-cassette holder 252), which is placed on in mesh with coupling gear 259, also moves horizontally, as coupling gear 259 travels horizontally. In this operation, movable rack 269 (S-cassette holder 252) meshed with small-diametric gear part 259b turned by the rolling of coupling gear 259, moves further toward the chassis interior as it rolls over small-diametric gear part 259b. Therefore, S-cassette holder 252 travels further, which is the distance in which movable rack 269 moves over the rolling small-diametric gear part 259b, than L-cassette holder 251.

During this, L-holder side plate 258 is guided with its 1st and 2nd slider axles 261A and 261B engaging 1st and 2nd guide slots 271a and 271b of frames 271A and 271B.

Further, when 1st slider axles 261A move toward the chassis interior, drive arms 274A and 274B whose slots 274b are engaged with 1st slider axles 261A, swayingly move their distal ends toward the chassis interior (in the clockwise direction in FIG. 27, and in the counterclockwise direction in FIG. 28). Since drive arms 274A and 274B are coupled by link shaft 275, timing gears 276, 276 and semicircular gears 274a, they will sway in synchronism.

As drive arm 274B sways, double-acting plate 278 meshed with semicircular gear 274c moves slightly toward the chassis interior. During this, since driving plate 279 will not move, double-acting plate 278 will move whilst extending double-acting spring 280 provided between double-acting plate 278 and driving plate 279.

Figure 29B:
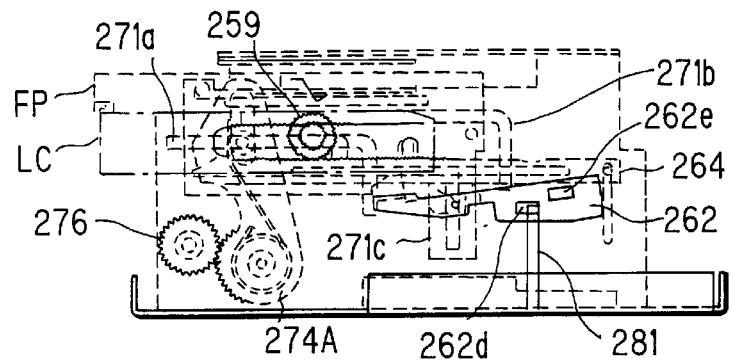

When double-acting plate 278 has moved toward the chassis interior and with this movement, timing change lever 262 has moved toward the chassis interior by a spacing distance between light-receiving sensor 281 and 1st opening 262d as shown in FIG. 29B, 1st opening 262d located on the front side with respect to the cassette's direction of movement becomes positioned in the sensor optical path for light-receiving sensor 281.

As a result, light-receiving sensor 281 receives the sensor light from the light emitter (not shown) provided in mech-chassis 270. In response to the signal of light sensing detection, an unillustrated driving motor is activated, and the driving force is transmitted to rack 279f. Accordingly, driving plate 279 moves toward the chassis interior. When it has moved to a position where abutment piece 279d abuts double-acting plate 278, double-acting plate 278 together with driving plate 279 begins to move toward the chassis interior.

Here, the amount of stroke of cassette holder 251 until 1st opening 262d reaches the sensor optical path for light-receiving sensor 281 will be equal to the aforementioned spacing distance between light-receiving sensor 281 and 1st opening 262d. Since 1st opening 262d is more distant from light-receiving sensor 281 than 2nd opening 262e, the amount of stroke of L-holder side plate 258 becomes greater. As a result, the amount of stroke of L-cassette holder 251 becomes greater.

As a result, the L-cassette LC held in cassette holder 251 moves deeper toward the chassis interior. When the rear side face of the cassette with respect to the cassette's direction of movement becomes substantially flush with the VTR front panel FP (at the same position as the front ends of frames 213A and 213B), light-receiving sensor 281 will detect the sensor light. Accordingly, the cassette in-pulling operation will start as described hereinbelow from a position where the L-cassette LC is only marginally projected out from the VTR front panel FP.

The cassette in-pulling operation will be made as follows: When double-acting plate 278 is moved toward the chassis interior by driving plate 279, drive arm 274B whose semicircular gear 274c is meshed with rack gear 278d of double-acting plate 278, sways in such a direction that the distal end thereof moves toward the chassis interior (in the clockwise direction in FIGS. 29A–29D) while drive arm 274A also sways in synchronism.

Then, 1st slider axles 261A, 261A engaging slots 274b and 274b of drive arms 274A and 274B move toward the chassis interior. With this movement, L-cassette holder 251 moves together with the L-cassette LC toward the chassis interior. During this operation, L-cassette holder 251 is guided by the engagement of 1st and 2nd slider axles 261A and 261B with 1st and 2nd guide slots 271a and 271b.

In this way, while L-cassette holder 251 moving toward the chassis interior, an unillustrated cassette size detecting switch detects the inserted cassette as to be an L-cassette LC, to thereby drive an unillustrated reel table shifting mechanism. In this way, the reel tables are adjusted so that the distance between the reel tables will match the reel distance of L-cassette LC.

Figure 29C:
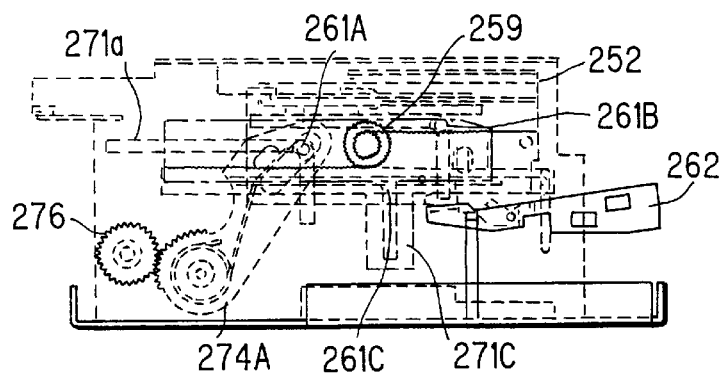
Figure 29D:
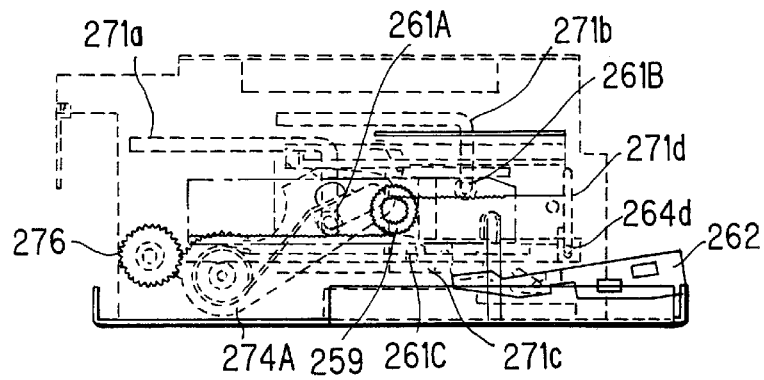

When L-cassette holder 251 further moves toward the chassis interior so as to reach the position shown in FIG. 29C, 1st and 2nd slider axles 261A, 261B will reach the vertically slotted portions of 1st and 2nd guide slots 271a and 271b, and 3rd slider axles 261C will become engaged with rib-formed guide slots 271c, though this is not illustrated. Then, drive arms 274A and 274B press 1st slider axles 261A downward along the vertically slotted portions of 1st guide slots 271a. With this movement, 2nd slider axles 261B move downwards along the vertically slotted portions of 2nd guide slots 271b while 3rd slider axles 261C move downwards along rib-formed guide slots 271c. As a result, L-cassette holder 251 will move downwards together with the L-cassette LC. During this, fixed rack 264 moves downwards together with L-cassette holder 251 since position regulating bosses 264c are guided along guide slots 271d.

The L-cassette LC, which already has been pulled in to the lowest position of the in-pulling operation, is placed on four cassette stays (not shown) planted on mech-chassis 270. In this condition, drive arms 274A and 274B urged by cassette pressing springs 274d press 1st slider axles 261A downwards. Therefore, the L-cassette LC becomes pressed in contact with the aforementioned cassette stays with its bottom slightly spaced away from L-cassette guiding piece 255.

Thus, the loading operation of L-cassette LC is completed. The ejecting operation of L-cassette LC is effected in the reverse order of the aforementioned loading operation.

Figure 30A:
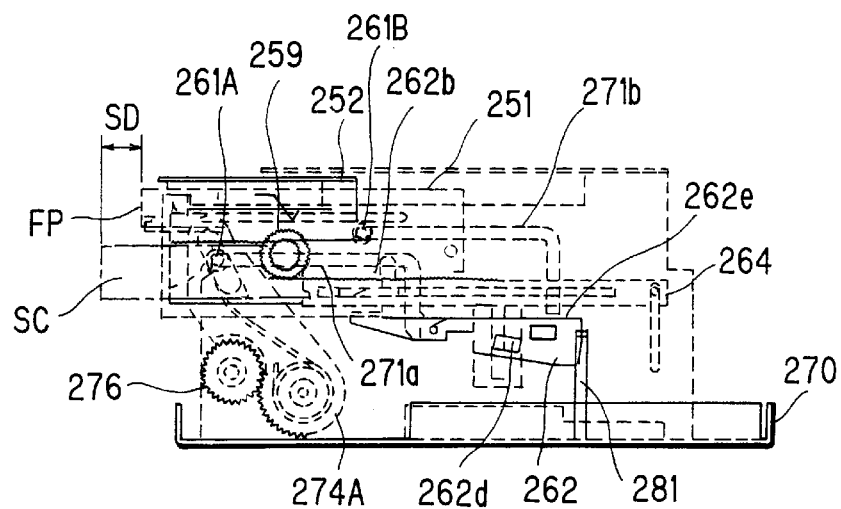
FIGS. 30A and 30B are views showing the steps of the loading operation of an S-cassette in the 5th embodiment.
Figure 30B:
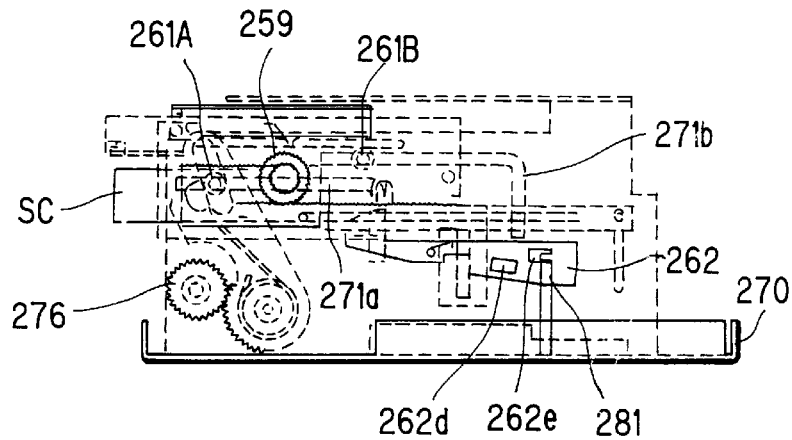

Referring next to FIGS. 30A and 30B, the loading operation of an S-cassette SC will be described. First, as shown in FIG. 30A, an S-cassette SC is inserted from an unillustrated inserting port so that it is placed on S-cassette guiding piece 267 of cassette holder 252. A further insertion of the S-cassette SC into the chassis interior makes the inner side edge thereof abut stopper piece 267a of S-cassette guiding piece 267. In this condition, the S-cassette SC is pressed against S-cassette guiding piece 267 from above by leaf springs 268, so that it will be stably held inside S-cassette holder 252.

When the S-cassette SC is further pushed in, the S-cassette SC engages and presses stopper piece 267a so that S-cassette holder 252 slightly moves toward the chassis interior. As a result, coupling gear 259 with its small-diametric gear part 259b in mesh with 2nd rack gear 269a of movable rack 269, turns to roll over the fixed rack 264 through large-diametric gear part 259a. Therefore, L-holder side plate 258 and L-cassette holder 251 which are integrally coupled with coupling gear 259 move toward the chassis interior by the distance in which coupling gear 259 rolls. S-cassette holder 252 placed on coupling gear 259 also travels by the distance in which coupling gear 259 moves toward the chassis interior. Therefore, as S-cassette holder 252 is pushed in, L-cassette holder 251 also moves, but S-cassette holder 252 is moved more than L-cassette holder 251.

During this movement, L-holder side plate 258 is guided with its 1st and 2nd slider axles 261A and 261B engaging 1st and 2nd guide slots 271a and 271b of frames 271A and 271B.

Further, when 1st slider axles 261A move toward the chassis interior, drive arms 274A and 274B whose slots 274b are engaged with 1st slider axles 261A, swayingly move their distal ends toward the chassis interior (in the clockwise direction in FIGS. 30A and 30B). Since drive arms 274A and 274B are coupled by link shaft 275, timing gears 276, 276 and semicircular gears 274a, they will sway in synchronism.

As drive arm 274B sways, double-acting plate 278 meshed with semicircular gear 274c moves slightly toward the chassis interior. During this, since driving plate 279 will not move, double-acting plate 278 will move whilst extending double-acting spring 280 provided between double-acting plate 278 and driving plate 279.

Figure 2:
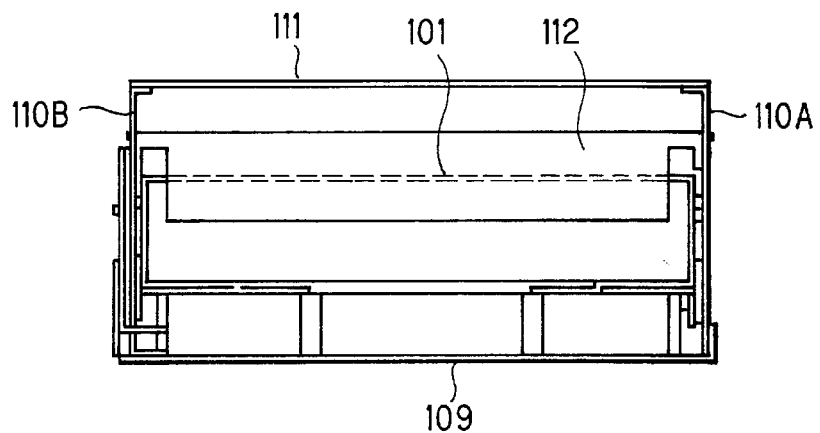
FIG. 2 is a front view showing the conventional cassette loading examples shown in FIGS. 1A and 1B.
Figure 3A:
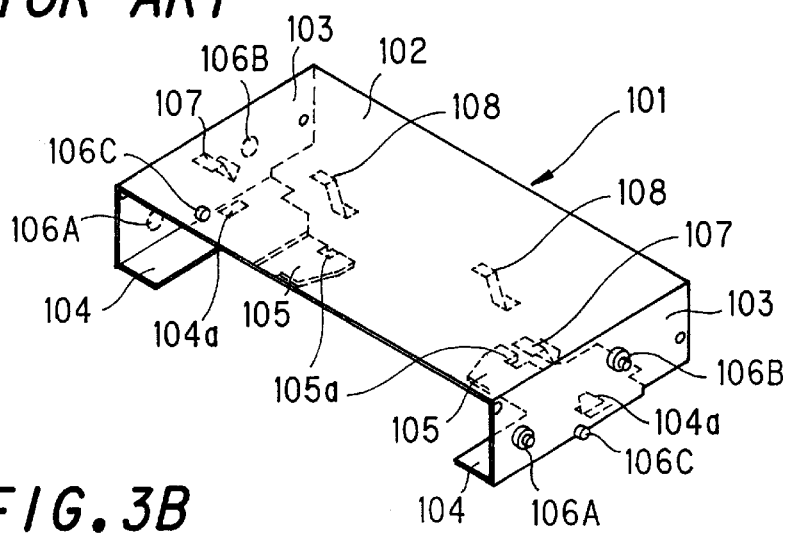
FIG. 3A is a perspective view showing a cassette holder in accordance with a conventional example.
Figure 3B:
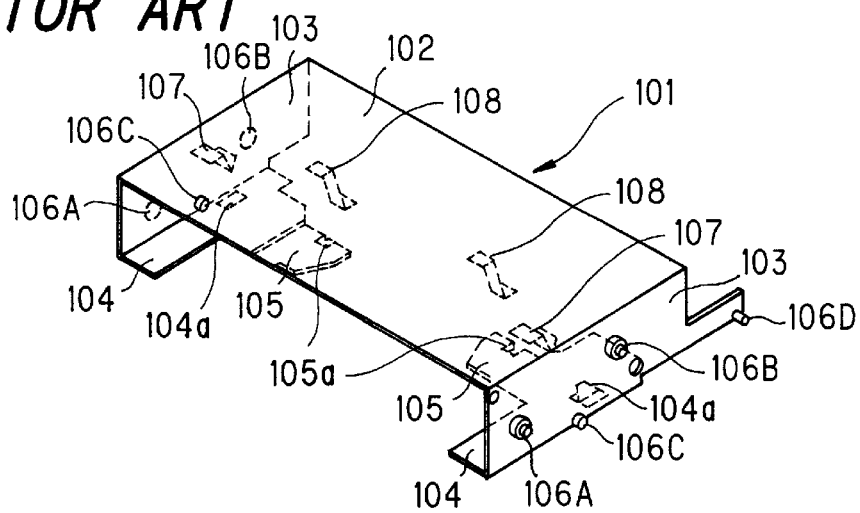
FIG. 3B is a perspective view showing a cassette holder in accordance with another conventional example.
Figure 4A:
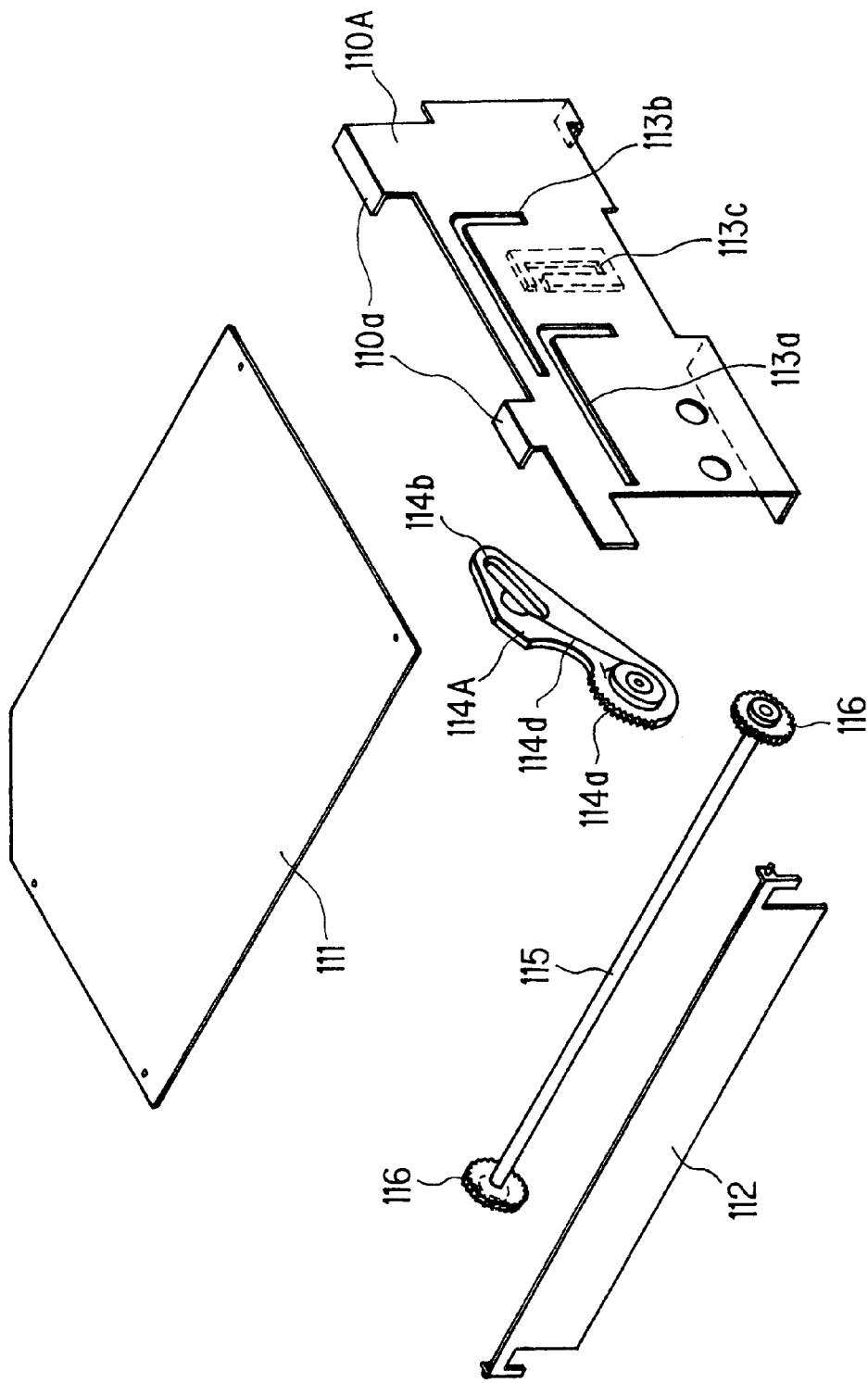
FIG. 4A is an exploded perspective view showing essential parts of a conventional example.
Figure 4B:
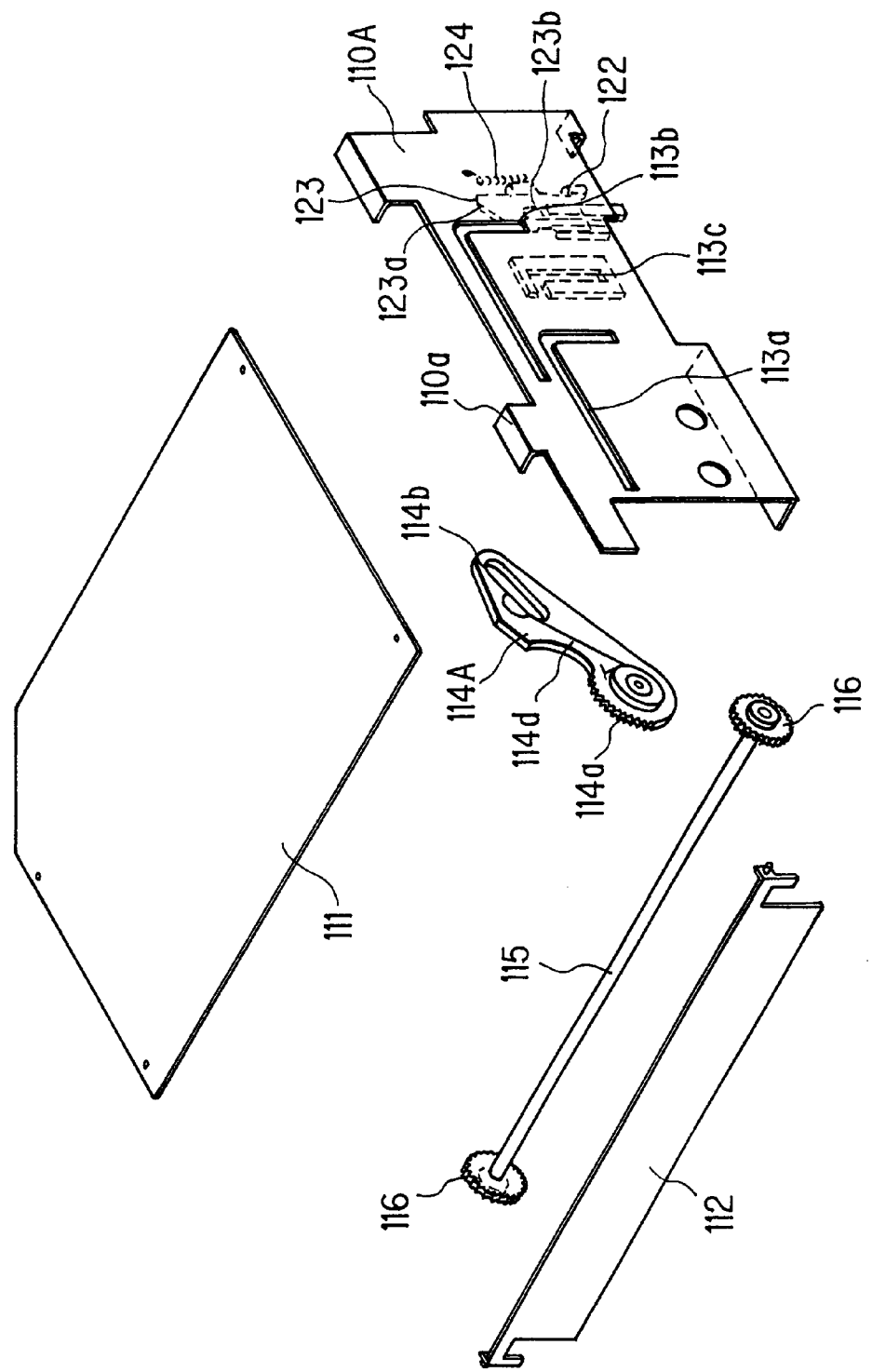
FIG. 4B is another perspective exploded view showing essential parts of a conventional example.
Figure 5:
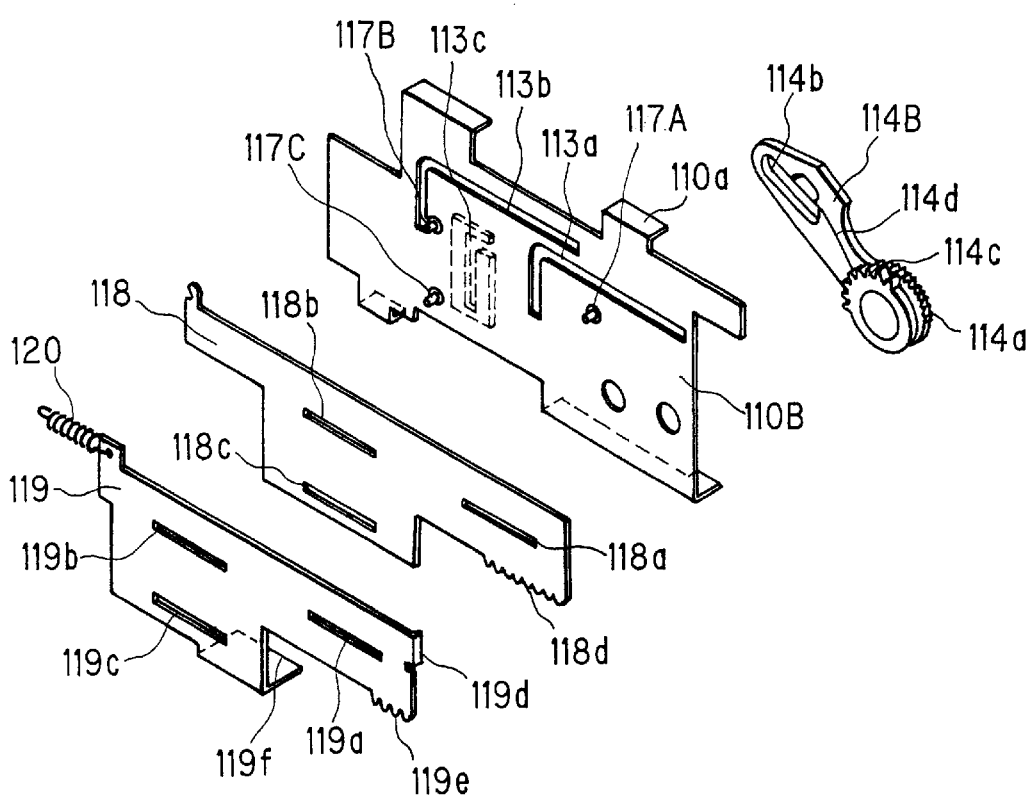
FIG. 5 is an exploded perspective view showing essential parts of a conventional example.
Figure 6A:
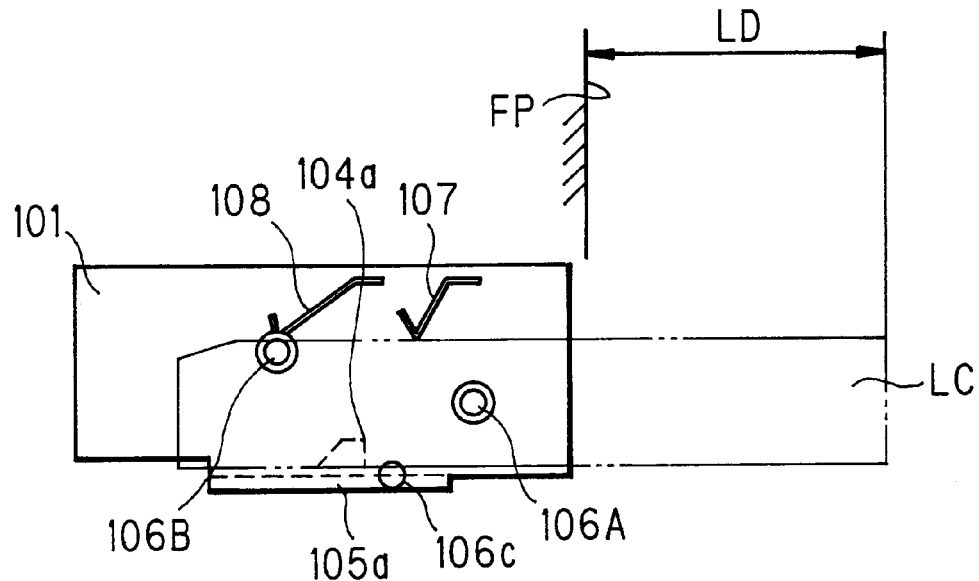
FIGS. 6A and 6B are views showing the steps of the loading operation of an L-cassette in accordance with a conventional example.
Figure 6B:
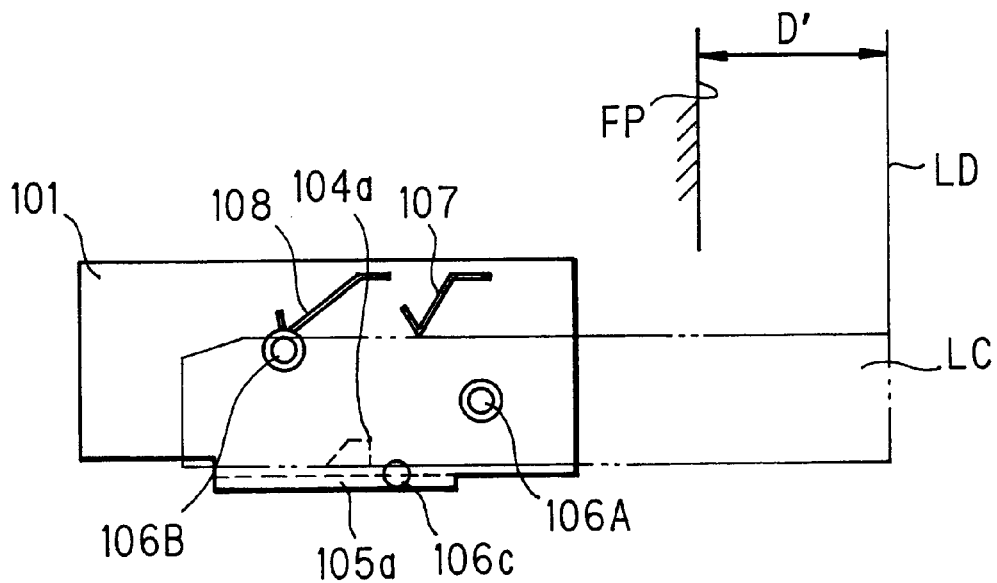
Figure 6C:
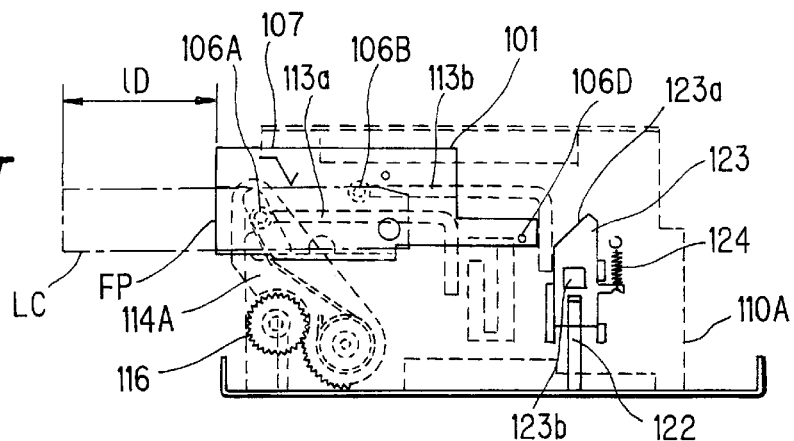
FIGS. 6C–6F are views showing the steps of the loading operation of an L-cassette in accordance with another conventional example.
Figure 6D:
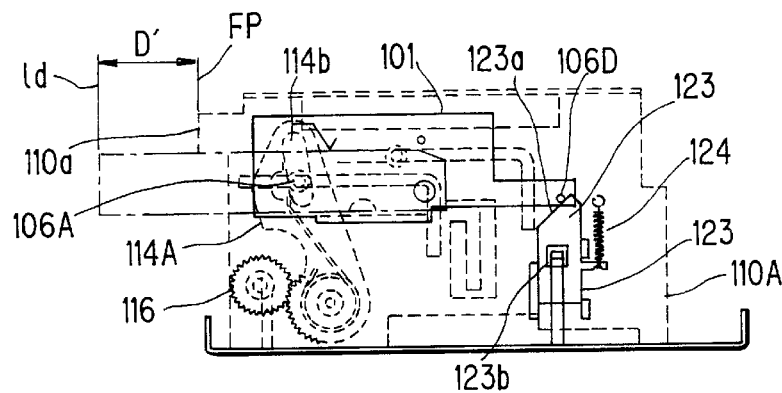
Figure 6E:
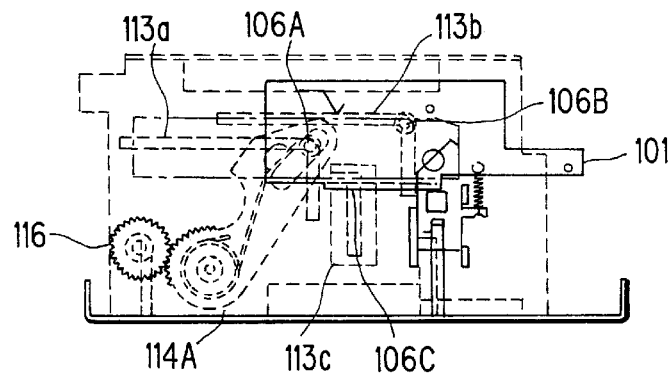
Figure 6F:
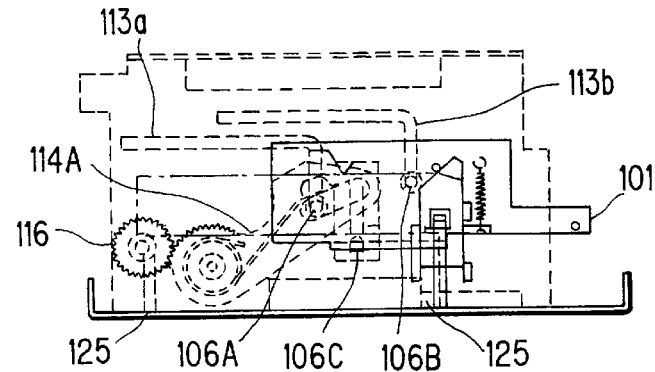
Figure 7A:
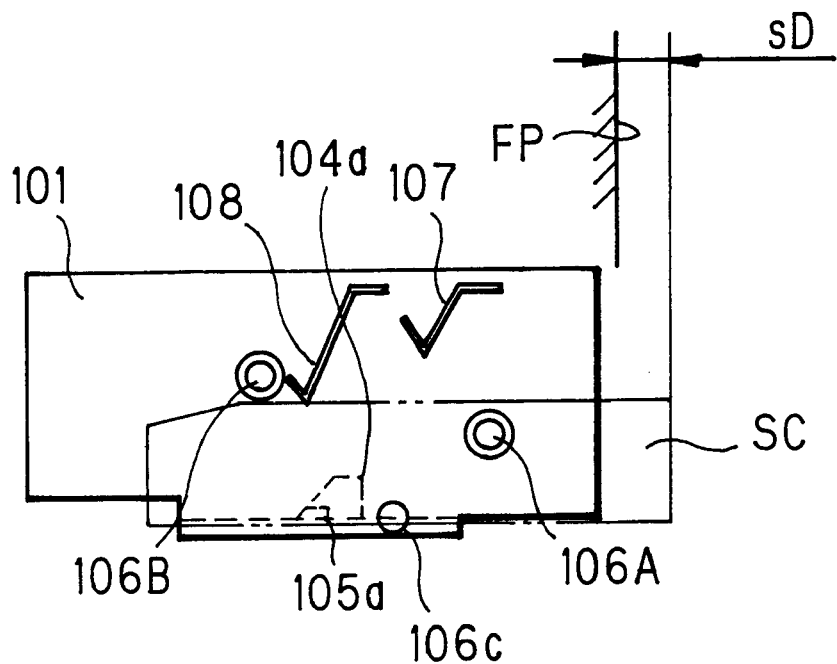
FIGS. 7A and 7B are views showing the steps of the loading operation of an S-cassette in accordance with a conventional example.
Figure 7B:
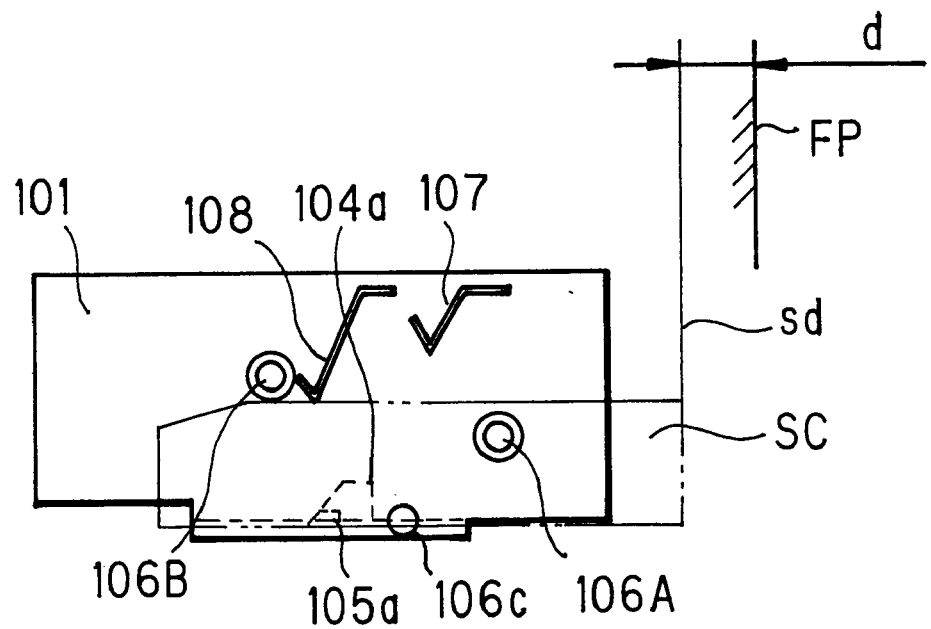
Figure 7C:
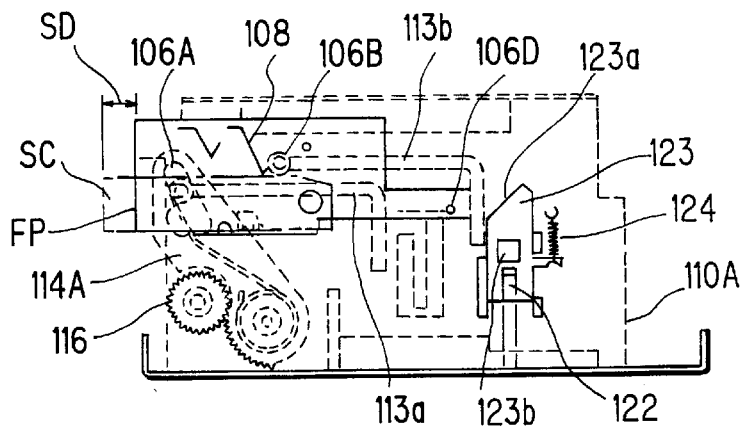
FIGS. 7C and 7D are views showing the steps of the loading operation of an S-cassette in accordance with another conventional example.
Figure 7D:
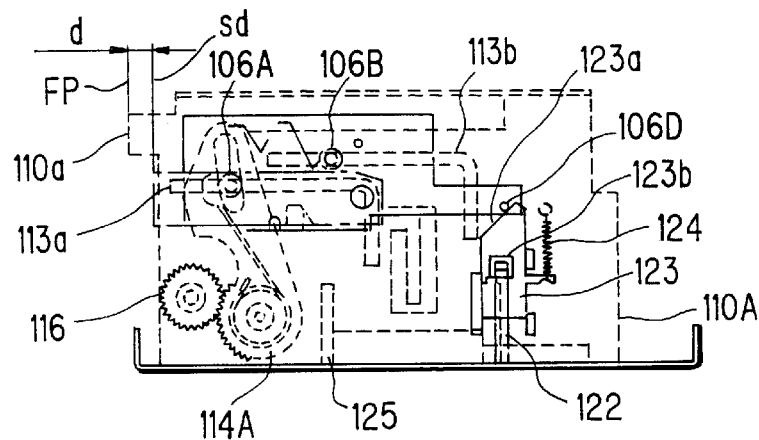
Figure 8:
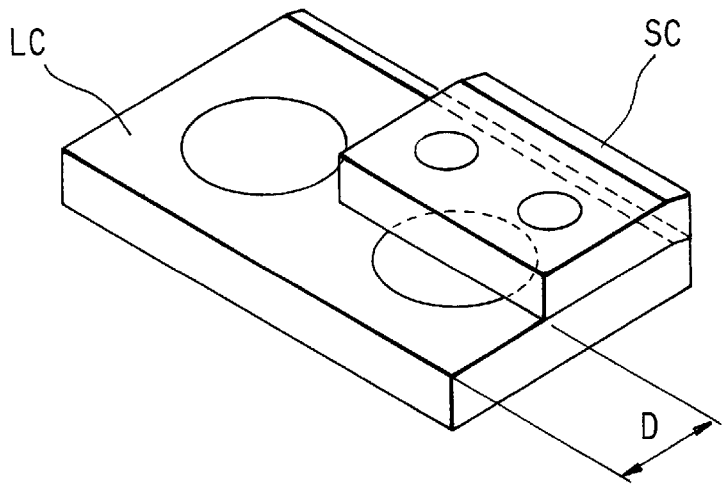
FIG. 8 is a perspective view showing the difference in size between an L-cassette and an S-cassette.
Figure 9:
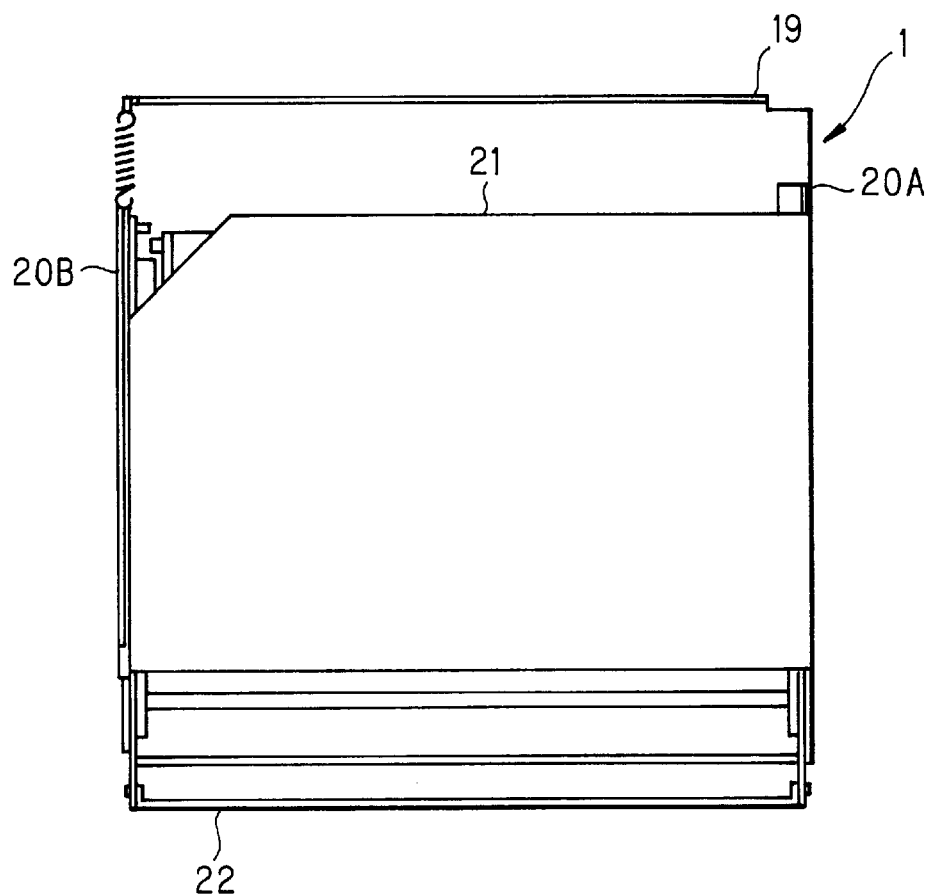
FIG. 9 is a plan view showing a cassette loading device in accordance with the 1st embodiment of the invention.
Figure 10:
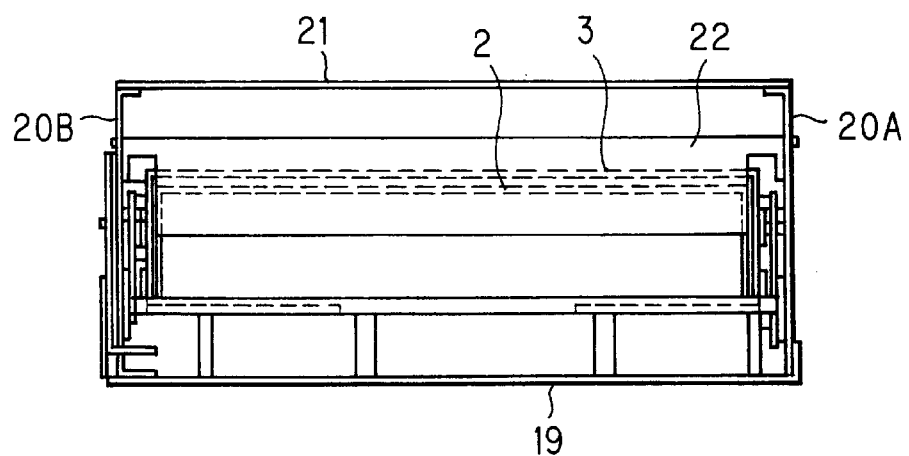
FIG. 10 is a front view showing the cassette loading device of the embodiment.
Figure 11:
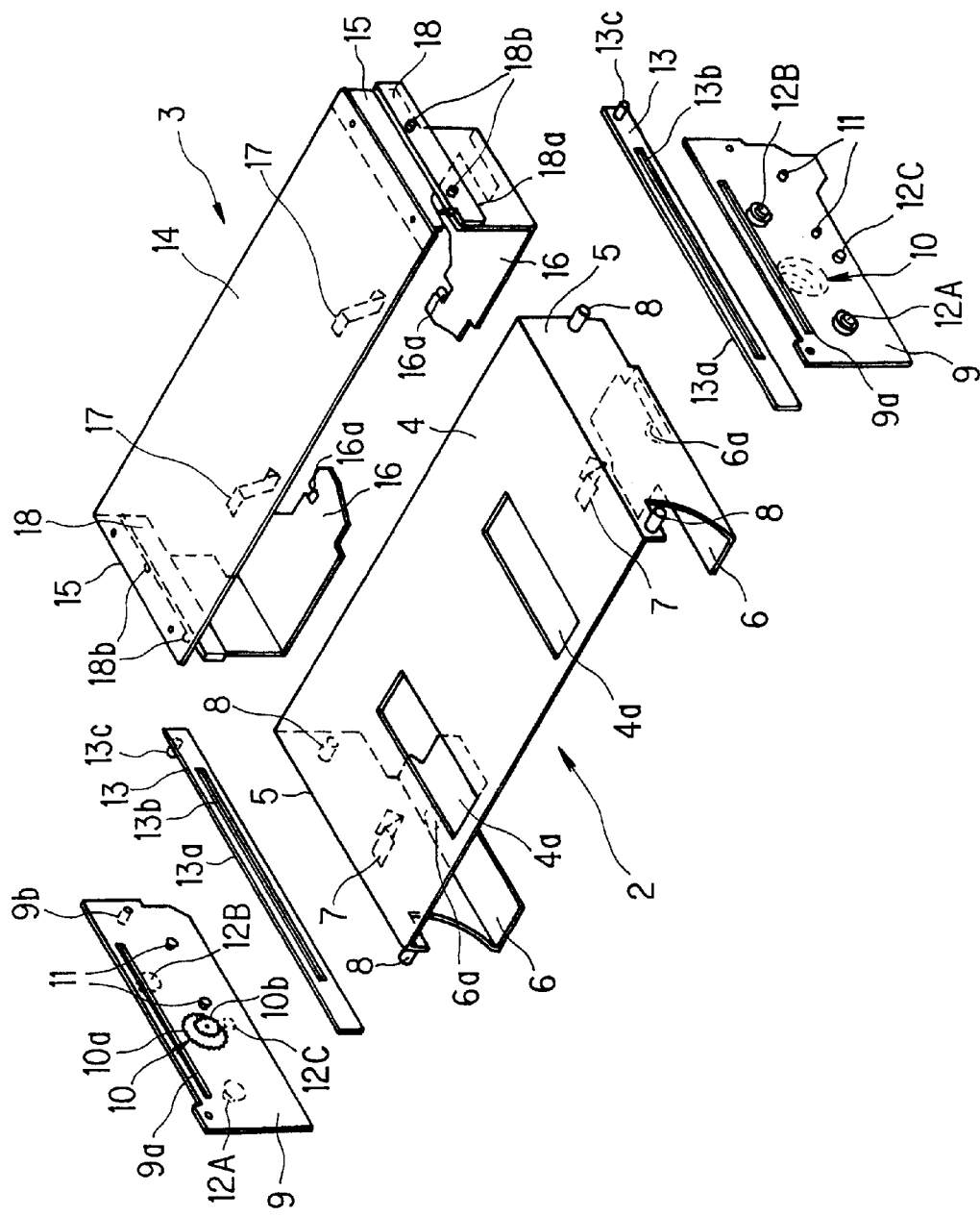
FIG. 11 is an exploded perspective view showing the cassette holders of the embodiment.

When double-acting plate 278 has moved toward the chassis interior and with this movement, timing change lever 262 (L-holder side plate 258) has moved toward the chassis interior by a spacing distance between light-receiving sensor 281 and 2nd opening 262e as shown in FIG. 30B, 2nd opening 262e located on the inner side with respect to the cassette's direction of movement becomes positioned in the sensor optical path for light-receiving sensor 281.

As a result, light-receiving sensor 281 receives the sensor slight from the light emitter (not shown) provided in mech-chassis 270. In response to the signal of light sensing detection, an unillustrated driving motor is activated, and the driving force is transmitted to rack 279f. Accordingly, driving plate 279 moves toward the chassis interior. When it has moved to a position where abutment piece 279d abuts double-acting plate 278, double-acting plate 278 together with driving plate 279 begins to move toward the chassis interior.

Here, the amount of stroke of S-cassette holder 252 until 2nd opening 262e reaches the sensor optical path for light-receiving sensor 281 will be equal to the aforementioned spacing distance between light-receiving sensor 281 and 2nd opening 262e. Since 2nd opening 262e is closer to light-receiving sensor 281 than 1st opening 262d, the amount of stroke of L-holder side plate 258 becomes smaller. As a result, the amount of stroke of S-cassette holder 252 also becomes smaller.

As a result, only if the S-cassette SC loaded in cassette holder 252 is pushed in with a relatively smaller amount of stroke than the pushed amount of L-cassette LC and when the rear side face of the cassette with respect to the cassette's direction of movement becomes substantially flush with the VTR front panel FP, light-receiving sensor 281 will detect the sensor light. Accordingly, without the need to push S-cassette SC into such a depressed position from the VTR front panel FP, the cassette in-pulling operation will start from a position where the rear face of the S-cassette SC becomes substantially flush with the VTR front panel FP. Therefore, there is no possibility that the fingers might be nipped between the S-cassette SC and the cassette inserting port (not shown).

The in-pulling operation of S-cassette is the same as that of L-cassette stated above so that the description is omitted.

In the above mode of the embodiment, although 1st to 3rd slider axles 261A to 261C are provided for L-cassette holder 251 so as to drive it by means of drive arms 274A and 274B, these 1st to 3rd slider axles 261A to 261C may be provided in S-cassette holder 252.

Further, in the above mode of the embodiment, S-cassette holder 252 is arranged in such a manner as to enclose L-cassette holder 251, but it is also possible to make such an arrangement that L-cassette holder 251 encloses S-cassette holder 252.

Thus, the invention thus configured has the following effects.

First, since there are a plurality of cassette holders, one of these holders can be selectively fed in accordance with the outside dimensions of the magnetic tape cassette to be used. Therefore, it becomes possible to feed a magnetic tape cassette in the most suitable fashion relative to the outside dimensions of the cassette, thus preventing occurrence of malfunctions and damage to the appliance due to improper handling during cassette feeding.

Next, since the inputting means moves one cassette holder with a different amount of stroke from the pushed amount of stroke for the magnetic tape cassette inserted in the other cassette holder, it is possible to feed a magnetic tape cassette placed in either cassette holder, in the most suitable fashion relative to the outside dimensions of the cassette, thus preventing occurrence of malfunctions and damage to the appliance due to an improper cassette feeding. Further, it is possible to feed any of the different kinds of magnetic tape cassettes by the same feeding operation, therefore it becomes possible to facilitate the cassette feeding operation, resulting in improved operativeness.

Since the inpulling means moves one cassette holder with a different amount of stroke from the pushed amount of stroke for the other cassette holder, it becomes possible to differentiate the starting position where each cassette holder receives a respective magnetic tape cassette, in accordance with the outside dimensions of the magnetic tape cassette. As a result, it becomes possible to equalize the projected amounts of the different magnetic tape cassettes from the cassette loading device at the beginning when each cassette is inserted into the holder. This allows the operator to perform the loading operation of magnetic tape cassettes of different types without caring about the outside dimensions of the cassettes, thus attaining easy and improved operativeness.

Next, since the changing means can change the starting position of the in-pulling operation of each magnetic tape cassette in accordance with its outside dimensions, it is possible to load a magnetic tape cassette in the most suitable fashion relative to the outside dimensions of the cassette, thus preventing occurrence of malfunctions and damage to the appliance due to an improper cassette feeding. Further, it is possible to load any of the different kinds of magnetic tape cassettes by the same feeding operation, therefore it becomes possible to realize easy handling in cassette loading operation as well as to improved operativeness.

What is claimed is:

1. A cassette loading device for handling plural kinds of magnetic tape cassettes, the cassettes being different in outside dimensions, comprising:

means for inputting which moves a magnetic tape cassette in linkage with a pushing operation of the cassette by the operator up to a position where a cassette in-pulling operation starts; and a plurality of cassette holders in conformity with the number of the plural kinds of magnetic tape cassettes to be handled, and the cassette holders are arranged such that one cassette holder is fitted into the other holder so as to slide relative to each other in the cassette's direction of movement.

2. A cassette loading device according to claim 1, wherein the means for inputting moves the other cassette holder with a different amount of stroke from the pushed amount of stroke for the magnetic tape cassette inserted in the one cassette holder.

3. A cassette loading device according to claim 2, wherein the means for inputting comprises:

a coupling gear which is composed of a pair of gear parts coaxially arranged with respect to each other and is rotatably attached to the one cassette holder;

a first rack gear which is provided so as to be unable to move in the cassette's direction of movement and is meshed with one gear part of the coupling gear; and a second rack gear which is fixed to the other cassette holder and meshed with the other gear part of the coupling gear.

4. A cassette loading device according to claim 1, wherein a single cassette inserting port is provided which is so configured that it can be fed with plurality of cassettes with various outside dimensions.

5. A cassette loading device according to claim 1, wherein the cassette holders are arranged such that one cassette holder is disposed within the other holder.

6. A cassette loading device for handling plural kinds of magnetic tape cassettes different in outside dimensions, comprising:

means for inputting which moves a cassette holder into which magnetic tape cassettes different in outside dimensions are selectively inserted, in linkage with a pushing operation of the magnetic tape cassette by the operator, to a position where a cassette in-pulling operation starts;

means for operating which selectively operates in accordance with the movement of the magnetic tape cassette held in the cassette holder and in accordance with the outside dimensions thereof; and means for changing which changes a position where the cassette in-pulling operation starts in the moving direction of the cassette holder, in accordance with the operating state of the means for operating;

wherein there are two cassette holders arranged such that one cassette holder is fitted into the other cassette holder so as to slide relative to each other in the cassette's direction of movement.

7. A cassette loading device according to claim 6, wherein the means for operating is rotationally supported at a central portion across the length, and has on one end thereof, an engaging portion which selectively engages a magnetic tape cassette inserted into the cassette holder in accordance with the outside dimensions of the cassette, and on the other end thereof, a plurality of position designating portions which are provided corresponding to the outside dimensions of the magnetic tape cassettes and are spaced from each other with respect to the moving direction of the cassette holder, while the means for changing selectively detects one position designating portion at the terminal end of the movement of the cassette and starts the cassette in-pulling operation at the time of the direction.

8. A cassette loading device according to claim 7, wherein the position designating portion comprises an opening formed in the means for operating and the means for changing comprises a detector optically detecting the opening.

9. A cassette loading device according to claim 7, wherein the position designating portion comprises a projection formed in the means for operating and the means for changing comprises a detector detecting the projection by mechanical engagement with the projection.

10. A cassette loading device according to claim 6, wherein a plurality of cassette holders are provided in conformity with the number of the plural kinds of magnetic tape cassettes to be handled and are arranged such that one cassette holder is fitted into the other holder so as to slide in the cassette's direction of movement relative to the other, and the means for inputting moves the other cassette holder with a different amount of stroke from the pushed amount of stroke for the magnetic tape cassette inserted in the one cassette holder.

11. A cassette loading device according to claim 7, wherein a plurality of cassette holders are provided in conformity with the number of the plural kinds of magnetic tape cassettes to be handled and are arranged such that one cassette holder is fitted into the other holder so as to slide in the cassette's direction of movement relative to the other, and the means for inputting moves the other cassette holder with a different amount of stroke from the pushed amount of stroke for the magnetic tape cassette inserted in the one cassette holder.

12. A cassette loading device according to claim 8, wherein a plurality of cassette holders are provided in conformity with the number of the plural kinds of magnetic tape cassettes to be handled and are arranged such that one cassette holder is fitted into the other holder so as to slide in the cassette's direction of movement relative to the other, and the means for inputting moves the other cassette holder with a different amount of stroke from the pushed amount of stroke for the magnetic tape cassette inserted in the one cassette holder.

13. A cassette loading device according to claim 9, wherein a plurality of cassette holders are provided in conformity with the number of the plural kinds of magnetic tape cassettes to be handled and are arranged such that one cassette holder is fitted into the other holder so as to slide in the cassette's direction of movement relative to the other, and the means for inputting moves the other cassette holder with a different amount of stroke from the pushed amount of stroke for the magnetic tape cassette inserted in the one cassette holder.

14. A cassette loading device according to claim 10, wherein the means for inputting comprises:

a coupling gear which is composed of a large-diametric gear part and a small-diametric gear part coaxially arranged with respect to each other and is rotatably attached to the one cassette holder;

a first rack gear which is provided so as to be unable to move in the cassette's direction of movement and meshed with the large-diametric gear part; and a second rack gear which is fixed to the other cassette holder and meshed with the small-diametric gear part of the coupling gear.

15. A cassette loading device according to claim 11, wherein the means for inputting comprises:

a coupling gear which is composed of a large-diametric gear part and a small-diametric gear part coaxially arranged with respect to each other and is rotatably attached to the one cassette holder;

a first rack gear which is provided so as to be unable to move in the cassette's direction of movement and meshed with the large-diametric gear part; and a second rack gear which is fixed to the other cassette holder and meshed with the small-diametric gear part of the coupling gear.

16. A cassette loading device according to claim 12, wherein the means for inputting comprises:

a coupling gear which is composed of a large-diametric gear part and a small-diametric gear part coaxially arranged with respect to each other and is rotatably attached to the one cassette holder;

a first rack gear which is provided so as to be unable to move in the cassette's direction of movement and meshed with the large-diametric gear part; and a second rack gear which is fixed to the other cassette holder and meshed with the small-diametric gear part of the coupling gear.

17. A cassette loading device according to claim 13, wherein the means for inputting comprises:

a coupling gear which is composed of a large-diametric gear part and a small-diametric gear part coaxially arranged with respect to each other and is rotatably attached to the one cassette holder;

a first rack gear which is provided so as to be unable to move in the cassette's direction of movement and meshed with the large-diametric gear part; and a second rack gear which is fixed to the other cassette holder and meshed with the small-diametric gear part of the coupling gear.

* * * * *